(12) United States Patent
Patten et al.

(10) Patent No.: US 7,394,451 B1
(45) Date of Patent: Jul. 1, 2008

(54) BACKLIT DISPLAY WITH MOTION SENSOR

(75) Inventors: Daniel Patten, Pleasant Grove, UT (US);
Scott S. Chandler, Payson, UT (US);
Paul T. Clegg, Lindon, UT (US); John McDaniel, Cedar Hills, UT (US)

(73) Assignee: Vantage Controls, Inc., Orem, UT (US)

( * ) Notice: Subject to any disclaimer, the term of this patent is extended or adjusted under 35 U.S.C. 154(b) by 622 days.

(21) Appl. No.: 10/934,332

(22) Filed: Sep. 3, 2004

Related U.S. Application Data

(60) Provisional application No. 60/500,146, filed on Sep. 3, 2003.

(51) Int. Cl.
*G09G 5/00* (2006.01)

(52) U.S. Cl. .................. 345/156; 345/173; 345/204; 345/211; 345/905; 361/600; 361/601; 361/691; 361/686

(58) Field of Classification Search ............... 345/156, 345/173, 204, 211, 905; 361/600, 601, 681, 361/686; 379/93.17; 455/90, 572, 575
See application file for complete search history.

(56) References Cited

U.S. PATENT DOCUMENTS

| 2,482,773 | A | 9/1949 | Hieronymus |
| D163,736 | S | 6/1951 | Bangert, Jr. |
| 2,828,413 | A | 3/1958 | Bowers et al. |
| 2,853,585 | A | 9/1958 | Danziger et al. |
| 3,284,667 | A | 11/1966 | Harris et al. |
| 3,491,249 | A | 1/1970 | Rabinow |
| 3,579,030 | A | 5/1971 | Bentham et al. |
| 3,689,886 | A | 9/1972 | Durkee |
| 3,697,821 | A | 10/1972 | Johnson |

(Continued)

FOREIGN PATENT DOCUMENTS

CA 2 245 671 9/2003

(Continued)

OTHER PUBLICATIONS

Horowitz et al., The Art of Electronics, 1989, Cambridge University Press, 2nd Ed., pp. 595-598.

(Continued)

*Primary Examiner*—Bipin Shalwala
*Assistant Examiner*—Vince E Kovalick
(74) *Attorney, Agent, or Firm*—McCarter & English, LLP

(57) ABSTRACT

An apparatus for interfacing with a control system, and in particular a home automation system. In one embodiment, the apparatus comprises an integrated LCD touch screen and motion sensor. The motion sensor is used to illuminate a backlight to the touch screen when a person approaches the apparatus. The sensitivity of the motion sensor may be adjusted through a graphical user interface displayed on the touch screen. In addition, the backlighting may be adjusted so that the illumination is at a specific level with the screen is on, i.e., when the motion sensor has been tripped, and a specific level when the screen is off. The apparatus may further comprise an IR receiver for receiving commands via a remote. In addition, the apparatus may be powered from a local bus or an external power supply. The apparatus may comprise a communications port for receiving customized pages from a computer.

58 Claims, 30 Drawing Sheets

U.S. PATENT DOCUMENTS

| | | | |
|---|---|---|---|
| 3,706,914 A | 12/1972 | Van Buren | |
| 3,707,682 A | 12/1972 | Harris | |
| 3,736,591 A | 5/1973 | Rennels et al. | |
| 3,746,923 A | 7/1973 | Spira et al. | |
| 3,763,394 A | 10/1973 | Blanchard | |
| 3,784,875 A | 1/1974 | Baker et al. | |
| 3,867,596 A | 2/1975 | Schadow | |
| 3,868,546 A | 2/1975 | Gilbreath et al. | |
| 3,868,547 A | 2/1975 | Kappenhagen et al. | |
| 3,885,116 A | 5/1975 | Kodaira | |
| 3,918,062 A | 11/1975 | Haruki et al. | |
| 3,940,660 A | 2/1976 | Edwards | |
| 3,980,954 A | 9/1976 | Whyte | |
| 3,986,423 A | 10/1976 | Rossum | |
| 3,996,441 A | 12/1976 | Ohashi | |
| 4,016,561 A | 4/1977 | Parker et al. | |
| 4,057,751 A | 11/1977 | Bonsignore et al. | |
| 4,060,735 A | 11/1977 | Pascucci et al. | |
| 4,095,139 A | 6/1978 | Symonds et al. | |
| D249,141 S | 8/1978 | Mayo | |
| 4,123,756 A | 10/1978 | Nagata et al. | |
| 4,131,777 A | 12/1978 | Bailey et al. | |
| 4,156,866 A | 5/1979 | Miller | |
| 4,163,218 A | 7/1979 | Wu | |
| 4,169,972 A | 10/1979 | Black, III et al. | |
| 4,185,531 A | 1/1980 | Oberheim et al. | |
| 4,187,528 A | 2/1980 | Morriss | |
| 4,194,099 A | 3/1980 | Mickelson | |
| 4,196,388 A | 4/1980 | Weller et al. | |
| 4,200,862 A | 4/1980 | Campbell et al. | |
| 4,203,096 A | 5/1980 | Farley et al. | |
| 4,206,443 A | 6/1980 | Britton | |
| 4,225,808 A | 9/1980 | Saraceni | |
| 4,246,494 A | 1/1981 | Foreman et al. | |
| 4,253,048 A | 2/1981 | Osako | |
| 4,259,619 A | 3/1981 | Wall | |
| 4,262,180 A | 4/1981 | Walter | |
| 4,274,045 A | 6/1981 | Goldstein | |
| 4,277,727 A | 7/1981 | LeVert | |
| 4,300,090 A | 11/1981 | Weber | |
| 4,303,811 A | 12/1981 | Parkinson | |
| 4,334,171 A | 6/1982 | Parman et al. | |
| 4,336,464 A | 6/1982 | Weber | |
| 4,338,595 A | 7/1982 | Newman | |
| 4,339,632 A | 7/1982 | Early et al. | |
| 4,359,670 A | 11/1982 | Hosaka et al. | |
| 4,381,456 A | 4/1983 | Saito et al. | |
| 4,388,567 A | 6/1983 | Yamazaki et al. | |
| 4,390,814 A | 6/1983 | Peek | |
| 4,392,187 A | 7/1983 | Bornhorst | |
| 4,395,660 A | 7/1983 | Waszkiewicz | |
| 4,418,333 A | 11/1983 | Schwarzbach et al. | |
| 4,421,966 A | 12/1983 | Pounds | |
| 4,436,972 A | 3/1984 | Scanlon | |
| 4,437,169 A | 3/1984 | Bertenshaw et al. | |
| 4,455,546 A | 6/1984 | Roszel | |
| 4,463,287 A | 7/1984 | Pitel | |
| 4,468,542 A | 8/1984 | Pounds | |
| 4,471,493 A | 9/1984 | Schober | |
| 4,484,190 A | 11/1984 | Bedard | |
| 4,485,374 A | 11/1984 | Meserow et al. | |
| 4,489,385 A | 12/1984 | Miller et al. | |
| 4,491,843 A | 1/1985 | Boubouleix | |
| 4,504,778 A | 3/1985 | Evans | |
| 4,521,843 A | 6/1985 | Pezzolo et al. | |
| 4,523,132 A | 6/1985 | Christiansen et al. | |
| 4,524,288 A | 6/1985 | Schimmelpennink et al. | |
| 4,527,198 A | 7/1985 | Callahan | |
| 4,532,395 A | 7/1985 | Zukowski | |
| 4,540,917 A | 9/1985 | Luchaco et al. | |
| 4,550,276 A | 10/1985 | Callahan et al. | |
| 4,560,909 A | 12/1985 | Peil | |
| 4,563,592 A | 1/1986 | Yuhasz et al. | |
| 4,575,660 A | 3/1986 | Zaharchuk et al. | |
| 4,582,967 A | 4/1986 | Brumit et al. | |
| 4,590,614 A | 5/1986 | Erat | |
| D285,066 S | 8/1986 | Liss et al. | |
| 4,611,198 A | 9/1986 | Levinson et al. | |
| 4,628,440 A | 12/1986 | Thompson | |
| 4,631,377 A | 12/1986 | Imazeki et al. | |
| 4,635,040 A | 1/1987 | Masot | |
| 4,638,299 A | 1/1987 | Campbell | |
| 4,644,320 A | 2/1987 | Carr et al. | |
| 4,680,536 A | 7/1987 | Roszel et al. | |
| 4,684,822 A | 8/1987 | Angott | |
| 4,689,547 A | 8/1987 | Rowen et al. | |
| 4,691,341 A | 9/1987 | Knoble et al. | |
| 4,695,820 A | 9/1987 | D'Aleo et al. | |
| 4,697,227 A | 9/1987 | Callahan | |
| 4,703,306 A | 10/1987 | Barritt | |
| 4,714,983 A | 12/1987 | Lang | |
| 4,716,409 A | 12/1987 | Hart et al. | |
| 4,719,446 A | 1/1988 | Hart | |
| 4,727,296 A | 2/1988 | Zaharchuk et al. | |
| 4,728,949 A | 3/1988 | Platte et al. | |
| 4,737,769 A | 4/1988 | Masot | |
| 4,742,475 A * | 5/1988 | Kaiser et al. | 700/278 |
| 4,745,351 A | 5/1988 | Rowen et al. | |
| 4,749,917 A | 6/1988 | Angott et al. | |
| 4,751,385 A | 6/1988 | Van Benthusysen et al. | |
| 4,755,792 A | 7/1988 | Pezzolo et al. | |
| 4,764,981 A | 8/1988 | Miyahara et al. | |
| 4,772,824 A | 9/1988 | Gulledge | |
| 4,772,825 A | 9/1988 | Tabor et al. | |
| 4,783,581 A | 11/1988 | Flowers et al. | |
| 4,792,731 A | 12/1988 | Pearlman et al. | |
| 4,797,599 A | 1/1989 | Ference et al. | |
| 4,814,776 A | 3/1989 | Caci et al. | |
| 4,823,069 A | 4/1989 | Callahan et al. | |
| 4,825,209 A | 4/1989 | Sasaki et al. | |
| 4,843,386 A | 6/1989 | Wolf | |
| 4,864,588 A | 9/1989 | Simpson et al. | |
| 4,876,552 A | 10/1989 | Zakman | |
| 4,878,010 A | 10/1989 | Weber | |
| 4,880,950 A | 11/1989 | Carson et al. | |
| 4,889,999 A | 12/1989 | Rowen | |
| 4,893,062 A | 1/1990 | D'Aleo et al. | |
| 4,908,806 A | 3/1990 | Nickolaus | |
| 4,918,432 A | 4/1990 | Pauley et al. | |
| 4,918,717 A | 4/1990 | Bissonnette et al. | |
| 4,924,109 A | 5/1990 | Weber | |
| 4,924,151 A | 5/1990 | D'Aleo et al. | |
| 4,940,903 A | 7/1990 | Brown, Jr. et al. | |
| 4,948,987 A | 8/1990 | Weber | |
| D310,349 S | 9/1990 | Rowen | |
| 4,955,084 A | 9/1990 | Umetsu et al. | |
| D311,382 S | 10/1990 | Mayo et al. | |
| D311,485 S | 10/1990 | Jacoby et al. | |
| D311,678 S | 10/1990 | Graef et al. | |
| 4,980,806 A | 12/1990 | Taylor et al. | |
| D313,738 S | 1/1991 | Mayo et al. | |
| 4,995,053 A | 2/1991 | Simpson et al. | |
| 5,003,318 A | 3/1991 | Berneking et al. | |
| 5,012,225 A | 4/1991 | Gill | |
| 5,017,837 A | 5/1991 | Hanna et al. | |
| 5,027,106 A | 6/1991 | Lizzi et al. | |
| 5,028,853 A | 7/1991 | Brown, Jr. et al. | |
| 5,030,893 A | 7/1991 | Spira et al. | |
| 5,034,602 A | 7/1991 | Garcia, Jr. et al. | |
| D319,429 S | 8/1991 | D'Aleo et al. | |
| 5,041,825 A | 8/1991 | Hart et al. | |
| 5,051,720 A | 9/1991 | Kittirutsunetorn | |
| 5,059,871 A | 10/1991 | Pearlman et al. | |
| 5,079,559 A | 1/1992 | Umetsu et al. | |

| | | | | | | |
|---|---|---|---|---|---|---|
| 5,086,385 | A | 2/1992 | Launey et al. | 5,975,711 A | 11/1999 | Parker et al. |
| 5,099,193 | A | 3/1992 | Moseley et al. | 5,977,901 A | 11/1999 | Fenner |
| 5,103,209 | A | 4/1992 | Lizzi et al. | 5,982,103 A | 11/1999 | Mosebrook et al. |
| 5,109,222 | A | 4/1992 | Welty | 6,032,202 A | 2/2000 | Lea et al. |
| 5,113,498 | A | 5/1992 | Evan et al. | 6,080,940 A | 6/2000 | Rice |
| D327,255 | S | 6/1992 | D'Aleo et al. | 6,091,205 A | 7/2000 | Newman, Jr. et al. |
| 5,128,855 | A | 7/1992 | Hilber et al. | 6,092,903 A | 7/2000 | Higgins, Jr. |
| 5,146,153 | A | 9/1992 | Luchaco et al. | 6,100,659 A | 8/2000 | Will et al. |
| 5,175,477 | A | 12/1992 | Grissom | 6,140,987 A | 10/2000 | Stein et al. |
| 5,187,655 | A | 2/1993 | Post et al. | 6,169,256 B1 | 1/2001 | Hanahara et al. |
| 5,189,412 | A | 2/1993 | Mehta et al. | 6,177,950 B1 * | 1/2001 | Robb .................. 348/14.01 |
| 5,191,265 | A | 3/1993 | D'Aleo et al. | 6,180,895 B1 | 1/2001 | Hutchinson et al. |
| 5,209,560 | A | 5/1993 | Taylor et al. | 6,184,481 B1 | 2/2001 | Chen |
| 5,225,765 | A | 7/1993 | Callahan et al. | 6,192,282 B1 | 2/2001 | Smith et al. |
| 5,237,264 | A | 8/1993 | Moseley et al. | 6,199,136 B1 | 3/2001 | Shteyn |
| 5,239,205 | A | 8/1993 | Hoffman et al. | 6,201,364 B1 | 3/2001 | Will et al. |
| 5,247,293 | A | 9/1993 | Nakagawa | 6,207,913 B1 | 3/2001 | Nakajima et al. |
| 5,248,919 | A | 9/1993 | Hanna et al. | 6,233,132 B1 | 5/2001 | Jenski |
| 5,280,296 | A | 1/1994 | Tan et al. | 6,310,609 B1 | 10/2001 | Morgenthaler |
| D344,264 | S | 2/1994 | D'Aleo et al. | 6,331,687 B1 | 12/2001 | Dunk et al. |
| 5,311,656 | A | 5/1994 | Eldershaw | 6,355,890 B1 | 3/2002 | Kuroda |
| 5,321,736 | A | 6/1994 | Beasley | 6,359,562 B2 | 3/2002 | Rubin |
| 5,327,426 | A | 7/1994 | Dolin, Jr. et al. | 6,369,524 B1 | 4/2002 | Sid |
| 5,340,954 | A | 8/1994 | Hoffman et al. | 6,369,800 B1 | 4/2002 | Nading et al. |
| 5,349,362 | A | 9/1994 | Forbes et al. | 6,400,271 B1 | 6/2002 | Davies, Jr. et al. |
| 5,357,170 | A | 10/1994 | Luchaco et al. | 6,426,769 B1 * | 7/2002 | Ludwig et al. .......... 348/14.08 |
| 5,361,184 | A | 11/1994 | El-Sharkawi et al. | D461,782 S | 8/2002 | Butler et al. |
| 5,361,985 | A | 11/1994 | Rein et al. | 6,453,687 B2 | 9/2002 | Sharood et al. |
| 5,367,133 | A | 11/1994 | Schmidt et al. | 6,467,924 B2 | 10/2002 | Shipman |
| 5,373,411 | A | 12/1994 | Grass et al. | 6,493,874 B2 | 12/2002 | Humpleman |
| 5,382,947 | A | 1/1995 | Thaler et al. | 6,510,995 B2 | 1/2003 | Muthu et al. |
| 5,399,940 | A | 3/1995 | Hanna et al. | 6,523,696 B1 | 2/2003 | Saito et al. |
| 5,400,041 | A | 3/1995 | Strickland | 6,549,190 B1 | 4/2003 | Windrem |
| 5,400,246 | A | 3/1995 | Wilson et al. | 6,555,774 B1 | 4/2003 | Nielsen |
| 5,401,927 | A | 3/1995 | Lundell et al. | 6,575,607 B1 | 6/2003 | Klemish et al. |
| 5,430,356 | A | 7/1995 | Ference et al. | 6,593,530 B2 | 7/2003 | Hunt |
| 5,436,510 | A | 7/1995 | Gilbert | 6,608,271 B2 | 8/2003 | Duarte |
| 5,452,291 | A | 9/1995 | Eisenhandler et al. | 6,618,764 B1 | 9/2003 | Shteyn |
| 5,455,464 | A | 10/1995 | Gosling | 6,628,517 B1 * | 9/2003 | Helot et al. .................. 361/686 |
| 5,455,761 | A | 10/1995 | Kushiro et al. | 6,640,141 B2 | 10/2003 | Bennett |
| 5,463,286 | A | 10/1995 | D'Aleo et al. | 6,646,843 B1 | 11/2003 | Newman, Jr. et al. |
| 5,467,264 | A | 11/1995 | Rauch et al. | 6,674,248 B2 | 1/2004 | Newman, Jr. et al. |
| 5,473,202 | A | 12/1995 | Mudge et al. | 6,680,730 B1 | 1/2004 | Shields et al. |
| 5,481,750 | A | 1/1996 | Parise et al. | 6,753,661 B2 | 6/2004 | Muthu et al. |
| 5,490,144 | A | 2/1996 | Tran et al. | 6,774,328 B2 | 8/2004 | Adams et al. |
| 5,495,406 | A | 2/1996 | Kushiro et al. | 6,797,902 B2 | 9/2004 | Farage et al. |
| 5,523,631 | A | 6/1996 | Fishman et al. | 6,882,111 B2 | 4/2005 | Kan et al. |
| 5,555,150 | A | 9/1996 | Newman, Jr. | 6,909,424 B2 | 6/2005 | Liebenow et al. |
| 5,563,459 | A | 10/1996 | Kurosawa et al. | 6,931,364 B1 | 8/2005 | Anturna |
| 5,565,855 | A | 10/1996 | Knibbe | 6,950,087 B2 | 9/2005 | Knox et al. |
| 5,565,865 | A | 10/1996 | So | 6,965,848 B2 | 11/2005 | Ballus |
| 5,574,431 | A | 11/1996 | McKeown et al. | 6,967,448 B2 | 11/2005 | Morgan et al. |
| 5,588,760 | A | 12/1996 | So | 6,967,565 B2 | 11/2005 | Lingemann |
| 5,598,322 | A | 1/1997 | Von Arx et al. | 7,130,774 B2 | 10/2006 | Thomas et al. |
| 5,637,930 | A | 6/1997 | Rowen et al. | 2001/0000422 A1 | 4/2001 | Sid |
| 5,638,296 | A | 6/1997 | Johnson et al. | 2001/0024967 A1 * | 9/2001 | Bauer ..................... 455/574 |
| 5,640,141 | A | 6/1997 | Myllymäki | 2001/0034250 A1 * | 10/2001 | Chadha ................... 455/566 |
| 5,651,286 | A * | 7/1997 | Champion et al. ........ 73/290 V | 2001/0047250 A1 | 11/2001 | Schuller et al. |
| 5,657,005 | A | 8/1997 | Seebeck et al. | 2001/0047251 A1 | 11/2001 | Kemp |
| 5,668,358 | A | 9/1997 | Wolf et al. | 2001/0055003 A1 | 12/2001 | Chi et al. |
| 5,711,588 | A | 1/1998 | Rudisill | 2002/0016639 A1 | 2/2002 | Smith et al. |
| 5,726,644 | A | 3/1998 | Jednacz et al. | 2002/0026533 A1 | 2/2002 | Dutta et al. |
| 5,736,965 | A | 4/1998 | Mosebrook et al. | 2002/0037004 A1 | 3/2002 | Bossemeyer et al. |
| 5,743,801 | A * | 4/1998 | Welander ................. 463/44 | 2002/0071139 A1 * | 6/2002 | Janik ..................... 358/1.15 |
| 5,748,828 | A | 5/1998 | Steiner et al. | 2002/0118182 A1 * | 8/2002 | Weindorf et al. ........... 345/204 |
| 5,790,202 | A * | 8/1998 | Kummer et al. ........... 348/553 | 2002/0143805 A1 * | 10/2002 | Hayes et al. ............. 707/500 |
| 5,796,382 | A | 8/1998 | Beeteson | 2002/0146674 A1 * | 10/2002 | Betz et al. ............... 434/350 |
| 5,801,345 | A | 9/1998 | Mikula-Curtis et al. | 2003/0009315 A1 | 1/2003 | Thomas et al. |
| 5,861,809 | A | 1/1999 | Eckstein et al. | 2003/0012035 A1 | 1/2003 | Bernard |
| 5,905,442 | A | 5/1999 | Mosebrook et al. | 2003/0034426 A1 * | 2/2003 | Chadwick ............... 248/309.1 |
| 5,912,443 | A | 6/1999 | Hasunuma | 2003/0038224 A1 * | 2/2003 | Monson et al. ............. 248/634 |
| 5,960,942 | A | 10/1999 | Thornton | 2003/0043127 A1 * | 3/2003 | Satoh et al. .............. 345/204 |
| 5,962,109 | A | 10/1999 | Schwietz | 2003/0052770 A1 | 3/2003 | Mansfield, Jr. et al. |

| | | | |
|---|---|---|---|
| 2003/0056012 | A1 | 3/2003 | Modeste et al. |
| 2003/0129969 | A1 | 7/2003 | Rucinski |
| 2003/0217367 | A1* | 11/2003 | Romano ................... 725/118 |
| 2003/0227490 | A1* | 12/2003 | Kim ........................... 345/810 |
| 2003/0227894 | A1 | 12/2003 | Wang et al. |
| 2003/0233429 | A1 | 12/2003 | Matte et al. |
| 2003/0235029 | A1* | 12/2003 | Doherty et al. ............. 361/683 |
| 2004/0024624 | A1 | 2/2004 | Ciscon et al. |
| 2004/0037288 | A1 | 2/2004 | Bourgart et al. |
| 2004/0038683 | A1 | 2/2004 | Rappaport et al. |
| 2004/0054747 | A1 | 3/2004 | Breh et al. |
| 2004/0088082 | A1 | 5/2004 | Ahmed |
| 2004/0113945 | A1 | 6/2004 | Park et al. |
| 2004/0143428 | A1 | 7/2004 | Rappaport et al. |
| 2004/0153178 | A1* | 8/2004 | Koch et al. ................... 700/94 |
| 2004/0225811 | A1 | 11/2004 | Fosler |
| 2004/0267385 | A1 | 12/2004 | Lingemann |
| 2005/0066358 | A1* | 3/2005 | Anderson et al. ............. 725/39 |

FOREIGN PATENT DOCUMENTS

| | | |
|---|---|---|
| DE | 30 08 339 A1 | 9/1981 |
| DE | 30 12 840 A1 | 10/1981 |
| DE | 32 21 873 A1 | 1/1984 |
| DE | 32 24 997 A1 | 1/1984 |
| DE | 219 637 A1 | 3/1985 |
| DE | 43 08 161 A1 | 9/1994 |
| EP | 0 022 516 | 1/1981 |
| EP | 0 040 339 | 11/1981 |
| EP | 0 054 582 | 6/1982 |
| EP | 0 196 347 | 10/1986 |
| EP | 0 293 569 | 12/1988 |
| EP | 0 327 128 | 8/1989 |
| EP | 0 346 614 | 12/1989 |
| EP | 0 357 136 | 3/1990 |
| EP | 0 361 734 | 4/1990 |
| EP | 0 435 224 | 7/1991 |
| EP | 0 466 152 | 1/1992 |
| EP | 0 513 443 | 11/1992 |
| EP | 0 552 769 | 7/1993 |
| EP | 0 555 869 | 8/1993 |
| EP | 0 558 349 | 9/1993 |
| EP | 0 616 451 | 9/1994 |
| EP | 0 626 635 | 11/1994 |
| EP | 0 687 078 | 12/1995 |
| FR | 2 701 115 | 9/1994 |
| GB | 1090891 | 11/1967 |
| GB | 1 215 009 | 12/1970 |
| GB | 2 076 180 | 11/1981 |
| GB | 2 097 918 | 11/1982 |
| GB | 2 099 222 | 12/1982 |
| GB | 2 166 328 | 4/1986 |
| WO | WO-86/06890 | 11/1986 |
| WO | WO-90/08418 | 7/1990 |
| WO | WO-93/13507 | 7/1993 |
| WO | WO-95/32595 | 11/1995 |
| WO | WO-97/29560 | 8/1997 |

OTHER PUBLICATIONS

Ademco, "No. 5827BD Wireless Bidirectional Console used with No. 5800TH Transmitter Module Installation Instructions and Operating Guide," Aug. 1993.

Ademso, "No. 5827BD Wireless Bidirectional Console Installation and Setup Guide," Feb. 2004.

Advanced Control Technologies, Inc., "Innovative and Quality Solutions to Control Problems!" www.act-solutions.com, at least as early as Aug. 23, 2005.

Advanced Control Technologies, Inc., "Introducing the Next Generation of Home Control Systems HomePro RF," Mar. 17, 2006.

Air Conditioning Heating & Refrigeration News, "The search for standard automation protocols narrows," Air Conditioning Heating & Refrigeration News, vol. 191, No. 5, p. 9, Jan. 1994.

Anonymous, "Echelon releases Lonworks control network protocol, opening up huge potential," Sensor Review, vol. 16, No. 4, p. 9, 1996.

Anonymous, "New products offer high-speed transmission in control networks," Sensor Review, vol. 13, No. 4, p. 39, 1993.

Appliance Manufacturer, "1 Million Nodes," Appliance Manufacturer, vol. 44, No. 1, p. 16, Jan. 1996.

Ballerini et al., "AISI Research and MPR Ltd. to Develop and Market Home Automation Products for Telecommunications Industry," Buisness Wire, Sec. 1, p. 1, Jun. 2, 1989.

Berger, "Plug-In Remote Controls For The Whole House," Home Mechanix, vol. 88, No. 762, pp. 26-29, 76, Feb. 1992.

Bertsch, "Development Tools for Home Automation," IEEE Transactions on Consumer Electronics, vol. 36, No. 4, pp. 854-858, Nov. 1990.

Beuth Verlag GMBH, "DIN 19 245 Teil 1: Profibus," DIN Deutsches Institute fur Normung E.V., Apr. 1991.

Boughton, "Hard-Wired Home: Automated systems can control everything from lights to curling irons to hot tubs—all at the push of a button," The San Francisco Chronicle, p. Z1, Aug. 30, 1995.

Buffkin, "CEBus, LonWorks heading from 'HomeLAN,'" Electronic Engineering Times, vol. 847, p. 58, May 8, 1995.

Bushby, "The BACnet communication protocol for building automation systems," Ashrae Journal, pp. 14-21, Apr. 1991.

Business Week, "Getting all your appliances on the same wavelength," Business Week, vol. 3088, p. 92E, Jan. 23, 1989.

Butler, "Personal Technology at Home with Technology: LonWorks may run home of the future," The Atlanta Journal the Atlanta Constitution, p. P6, Nov. 19, 1995.

Butler, "Wireless Light Switch Flexible, Easy to Install," the Columbus Dispatch, p. 10H, Oct. 23, 1993.

Butler, "Add-On Light Switches Eliminate Wiring Hassles," Roanoke Times & World News, p. 3, Jun. 6, 1995.

Bybee, "Build Reacts: The Radio-Electronics Advanced Control System," Radio-Electronics, vol. 59, No. 10, p. 65, Oct. 1988.

Caristi, "Carrier-current remote control," Electronics Now, vol. 66, No. 6, p. 49, Jun. 1, 1995.

Carlin, "On the bus," Sound & Image, vol. 4, No. 3, p. 20, Fall, 1994.

www.cbus-shop.com, "What's new in CBus ShopTM?" www.cbus-shop.com, at least as early as Jun. 18, 2004.

www.cbus-shop.com, "U105RHH001BPW1: Handheld Remote Unit—Pearl White," www.cbus-shop.com, at least as early as Jun. 18, 2004.

Coffey, "CEBus," email, at least as early as Jun. 2004.

Compute! "Open the pod bay door," Compute!, vol. 14, No. 11, p. 44, Dec. 1992.

Cooper, "X10 FAQ html version. Based on the X10 FAQ version 1.08," Jan. 8, 1995.

Crevier, "Scott Crevier's X-10 Web Interface," at least as early as Nov. 11, 2002.

Cross et al., "A Fiber Optic Home Automation System," IEEE Transactions on Consumer Electronics, vol. 39, No. 3, pp. 636-645, Aug. 1993.

Davidson, "Echelon's Local Operating Network," Circuit Cellar Ink, pp. 74-77, Jun./Jul. 1991.

Davidson, "Habitech 94," The Computer Application Journal, vol. 47, pp. 46-51, Jun. 1994.

Davis, "Zigbee Aims at Home, Utility Markets," www.reed-electronics.com/electronicnews/article/CA469135%20, Oct. 7, 2004.

Delaney, "The CEBus perspective," Appliance Manufacturer, vol. 41, No. 5, p. 31, May 1993.

DiChristina et al., "Controlling the Home," Popular Science, vol. 240, No. 5, p. 48, May 1992.

DiLouie, "Automated Controls Can Save Energy," Facilities Design & Management, vol. 14, No. 11, p. 35, Nov. 1995.

Douligeris et al., "The Consumer Electronic Bus Symbol Encoding Sublayer: A Twisted Pair Implementation," IEEE, pp. 385-388, 1992.

Douligeris, "Intelligent Home Systems: Low-cost computers and fiber optics make it possible to implement systems that can integrate data, voice, and visual communications inside the home," IEEE Communications Magazine, pp. 52-61, Oct. 1993.

Douligeris et al., "Communications and Control for a Home Automation System," IEEE, pp. 171-175, 1991.

Driscoll, "A Timeline for Home Automation," www.eddriscoll.com, 2002.
Edden, "Modelling CEBus Home Automation with Knowledge Based Tools," IEEE, pp. 623-627, 1990.
Electronic Engineering Times, "LONworks gets interface boards," Electronic Engineering Times, p. 54, Jul. 3, 1995.
Electronic Industries Association. EIA-600 (Sections 600.10, 600.31, 600.32, 600.33, 600.35, 600.37, 600.38, 600.41, 600.42, 600.81, and 600.82). Feb. 1995.
Electronic News, "New CEBus devices target energy management," Electronic News, vol. 40, No. 2006, p. 48, Mar. 21, 1994.
Fisher, "Switch-On CEBus: A CAL Interpreter," The Computer Applications Journal, vol. 31, pp. 24-30, Feb. 1993.
Futurist, "Home automation," Futurist, vol. 28, No. 5, p. 7, Sep./Oct. 1994.
GE. Appendix A, GE Authentication and Encryption Algorithm. Version II. Nov. 1995.
Gfeller et al., "Wireless In-House Data Communication via DIffuse Infrared Radiation," Proceedings of the IEEE, vol. 61, No. 11, pp. 1474-1486, Nov. 1979.
Home Controls, Inc., Home Automation and Networking Catalog, No. 52, Fall 2005.
Homepro, "ZTH100 Radio Frequency Wireles Controller," 2001.
www.homeseer.com, "Z-Wave Information," www.homeseer.com, at least as early as Jun. 21, 2004.
www.homeseer.com, "Z-Wave Lamp Module (HomePro)," www.homeseer.com, at least as early as Jun. 21, 2004.
www.homeseer.com, "Z-Wave Remote Control (ivory)," www.homeseer.com, at least as early as Jun. 21, 2004.
House, "CEBus for the Masses," Home Automation & Building Control, pp. 61-68, Apr. 1995.
Hunt et al., "Are We There Yet?: CEBus Ready to Bring 'Home of the Future' into the Present," Chicago Tribune, p. 22, Mar. 1, 1996.
Intellon Corporation, "Intellon HomePlug7 Family of Products," 2005.
Intellon Corporation, "SSC P485 PL Transceiver IC," at least as early as Jul. 3, 2006.
Interim Standard. IS-60.04 Node Communications Protocol, Part 6: Application Layer Specification. Apr. 1996.
Iversen, "A New Push Begins to Sell a Home Bus," Electronics, vol. 61, No. 12, p. 40, Jun. 1988.
IW, "Building Blocks for Home Automation," IW, p. 23, May 15, 1995.
Jancsurak, "Smart receptacle for smart plugs," Electronic Industries Association, vol. 41, No. 4, p. 62, Apr. 1993.
Karpinski, "In-home networks draw industry attention," Interactive Age, vol. 2, No. 6, p. 39, Jan. 16, 1995.
Kingery, "Which One Should I Use #17. What is 'Extended Code'? (and does it wear a tuxedo?) Part 1—Different Ways of Counting," at least as early as Jun. 30, 2006.
Kingery, "Which One Should I Use #18. What is 'Extended Code'? Part 2—Big Indians and Little Indians," at least as early as Jun. 30, 2006.
Kirschner, "Smart at Last?" Popular Science, vol. 247, No. 1, p. 38, Jul. 1995.
Kleiman, "MacDaniel's Advice: Introduction to the X10 System," Sep. 24, 2001.
Krause, "Echelon-CEBus rivalry tangles decoder specs," Electronic News, vol. 41, No. 2067, p. 1, May 29, 1995.
Krause, "EIA sees potential CEBus role in U.S. NII Proposal," Electronic News, vol. 40, No. 2021, p. 38, Jul. 4, 1994.
Kung, "Perceived requirements concerning home automation," Trialog, pp. 1-5, Dec. 1995.
Lamson & Sessions, Product Installation Instructions, 2004.
Langreth, "Slow going for smart homes," Popular Science, vol. 242, No. 2, p. 60, Feb. 1993.
Leeb, "A User Interface for Home-Net," IEEE, pp. 897-902, 1994.
Lutron Electronics Co., Inc., "Homeworks7 seeTouch J Ordering Guide," 2003.
Lutron Electronics Co., Inc., "Homeworks7 Interactive Vareo7-Style Local Lighting Controls," 1998.
Lutron Electronics Co., Inc., Residential Lighting Controls Catalog, at least as early as Jun. 28, 2006.
Lutron Electronics Co., Inc., "RadioRA7 Wireless Home Lighting Control RA-IR, RB-IR Setup and Installation Guide Addendum for RadioRA7 Infrared Interface," 2001.
Meth, "Where Will Smart Homes Get Their Smarts?" Electronic Design, vol. 43, No. 19, pp. 61-64, Sep. 18, 1995.
Munro, "Automating the Home," Washington Technology, p. 1, Nov. 9, 1995.
Murray, "Wired and ready," Popular Science, vol. 247, No. 2, p. 36, Aug. 1995.
Nisley, "Two-Way Power Line Communication," The Computer Applications Journal, vol. 25, pp. 74-81, Feb./Mar. 1992.
Pacelle, "Automation Is Knocking at U.S. Homes—TVs Can Talk to Thermostats, but Cost Keeps Most Doors From Opening," Asian Wall Street Journal, p. 7, Sep. 29, 1992.
Palenchar, "Z-Wave Takes on Home-Automation Market," www.twice.com, Mar. 22, 2004.
Pargh, "High-tech functions improve new light switches," Chicago Sun-Times. p. 7, Oct. 7, 1990.
Parks, "The State of Home Systems," The Computer Applications Journal, vol. 25, pp. 12-13, Feb./Mar. 1992.
Parks Associates, Home Systems 94: Home Controls, Parks Associates, Dallas, 1994.
Parks et al., X-10 Ltd. Myths and Reality: The Facts Behind the Company and the Technology, Parks Associates, Dallas, 1994.
Phillips, "Installing a Home Alarm: Protect your property and enjoy extra conveniences with an affordable do-it-yourself system," Home Mechanix, vol. 90, No. 782, p. 60, Feb. 1994.
Price, "Product Development Flow Using Domosys HeadStart Suite," www.hometoys.com/htinews/aug99/articles/domosys/domosys.htm, Aug. 1999.
PR Newswire, "Cyberhouse Software Wins Mark of Excellence Award from Home Automation Association," PR Newswire, p. 325, Mar. 25, 1996.
Remlich, Jr., "Intelligent gas appliances," Appliance Manufacturer, vol. 41, No. 3, p. 63, Mar. 1993.
RF Locker, "RF Locker," at least as early as Jul. 2004.
Rochfort, "Sensory experience," Custom Builder, vol. 9, No. 5, p. S-28, Sep./Oct. 1994.
Ruling, "The Wybron Autopilot," TCI, vol. 29, No. 4, p. 54, Apr. 1995.
Schade, "Convenient Remote-Control Light Switching Saves Energy," Energy & Automation, vol. 9, No. 1, pp. 37-39, Jan./Feb. 1987.
Schade, "Switching of Lighting Installations by Remote Control," Elektrische Energie-Technik, vol. 29, No. 2, p. 18, Jun./Jul. 1984.
Schade, "New Aspects in the Horizontal Power Supply of Lighting Installations," Siemens Power Engineering, vol. 6, No. 4, pp. 238-239, Jul./Aug. 1984.
Schofield, "Home Automation Takes Off: Intellon products support a 'home electronic highway,'" Design News, pp. 84-87, Apr. 10, 1995.
www.shed.com, "x-10 is both a Company and the Technology that it developed," www.shed.com/x10.html, at least as early as Jun. 30, 2006.
www.smarthomepro.com, "Introducing Digital Wireless Lighting and Appliance Control," www.smarthomepro.com, at least as early as Jun. 21, 2004.
www.smarthomeusa.com, "Z-Wave Radio Frequency Wireless Controller," www.smarthomeusa.com, at least as early as Jun. 19, 2004.
www.smarthome.com, "Sophiscated Lighting Control for Your Home," www.smarthome.com, at least as early as Jun. 18, 2004.
www.smarthome.com, "Getting Started," www.smarthome.com, at least as early as Jun. 21, 2004.
www.smarthome.com, "A Full-Featured Dimmer for Every Home!" www.smarthome.com, at least as early as Jun. 21, 2004.
www.smarthome.com, "What is X10?" www.smarthome.com, at least as early as Jun. 21, 2004.
www.smarthome.com, "Automatically Turn On X10 Lights When You Enter the Room!" www.smarthome.com, at least as early as Jun. 18, 2004.
www.smarthome.com, "Control Lights and Appliances from the Comfort of Your Sofa!" www.smarthome.com, at least as early as Jun. 21, 2004.

Stauffer, "The Smart House System," The Computer Applications Journal, vol. 31, pp. 14-23, Feb. 1993.

Strassberg, "Home Automation Buses: Products really hit home," EDN, pp. 69-80, Apr. 13, 1995.

Taber, "The Arrival of a World Without Wires," Business for Central New Jersey, vol. 2, No. 3, Section 1, p. 3, Feb. 13, 1989.

Tanenbaum, Computer Networks, Prentice-Hall, Inc., Englewood Cliffs, New Jersey, pp. 144, 271-275, 1989.

TCI, "Lighting control (Buyers Guide)," TCI, vol. 28, No. 10, p. 56, Dec. 1, 1994.

Texas Instruments, Chipcon Products from Texas Instruments, 2006.

Teyssier, "BatiBUS: BatiBUS System Design Principles," Jun. 1990.

Winick, "The RF Medium in the Home—The Move to Spread Spectrum," IEEE Transactions on Consumer Electronics, vol. 37, No. 2, pp. 108-115, May 1991.

"Wireless hookups offered through radio technology," UCLA.

www.X10.com, "Let There Be Light," www.x10.com/news/articles/0309_light.htm, at least as early as Jul. 18, 2006.

www.X10.com, "SuperRemote Home Control Kit," www.x10.com, at least as early as Jun. 18, 2004.

www.X10.com, "X10 Powerline Carrier (PLC) Technology," www.x10.com/support/technology1htm, at least as early as Jun. 30, 2006.

X10PRO, "X10 Platform Basics," at least as early as Jun. 30, 2006.

Yoshida, "LONWorks connects," Electronic Engineering Times, vol. 769, p. 16, Oct. 25, 1993.

Zhonglei et al., "Simultaneous Control Signal and Power Transmission Through Mechanical Rotary Joint Without Wiring Connection," IEEE, pp. 1589-1593, 1996.

* cited by examiner

US 7,394,451 B1

BACKLIT DISPLAY WITH MOTION SENSOR

CROSS-REFERENCE TO RELATED APPLICATIONS

This application claims the benefit of U.S. Provisional Application No. 60/500,146, filed Sep. 3, 2003, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND OF THE INVENTION

1. The Field of the Invention

The present invention relates generally to displays, and more particularly, but not necessarily entirely, to programmable displays for interfacing with control systems.

2. Background Art

Liquid crystal displays (LCDs) are used in a variety of applications, including computers, flat screen televisions and instrumentation. Most LCDs require an illumination source, or backlight unit, for backlighting the LCD so that the image displayed on the LCD can be seen by a viewer. In designing such a backlight unit, the designer has to consider a number of design parameters. For example, the rated life of the backlight unit is an important consideration since frequent replacement of the backlight unit, or the light source therein, is costly and time consuming. The brightness of the display must be at a certain level in order for a viewer to see the image. Further, design concerns include the amount of time it takes for the backlight unit to begin operation after being turned on, the operating temperature of the backlight unit, the power consumption of the backlight unit, the stability of the brightness of the backlight unit over a temperature range and the amount of electromagnetic interference generated by the backlight unit.

The custom installation world is becoming more and more complex as a multitude of home control devices have become available. With this complexity, and these options, comes the need for a simple way to control every aspect of the integrated home. The skillful installer can accomplish much with a programmable keypad. However, there are many situations where a multi-page LCD touch screen is the only practical solution to provide the flexibility needed to satisfy a user.

Currently, there are many color touch screens on the market. Interestingly, most, if not all, of these can be integrated with existing home automation systems. However, these color touch screens come with a very high price and require extensive training to become proficient in designing attractive custom screens and in integrating with the automation system. Most touch screens cannot be viewed without a backlight. The backlight is needed to illuminate make the touch screen easy for a human to observe. One problem in the art is that the backlights have a limited life. In order to preserve this life, most touch screens have a timeout feature whereby the screen turns off after a period of time, perhaps 15 to 30 seconds. In order to turn screen on, a person simply touches the screen.

Despite the advantages of known display apparatuses, improvements are still being sought. For example, many of the displays lack useful features that make them adequate for their intended purposes.

The prior art is thus characterized by several disadvantages that are addressed by the present invention. The present invention minimizes, and in some aspects eliminates, the above-mentioned failures, and other problems, by utilizing the methods and structural features described herein.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE ILLUSTRATIVE EMBODIMENTS

Figure 1:
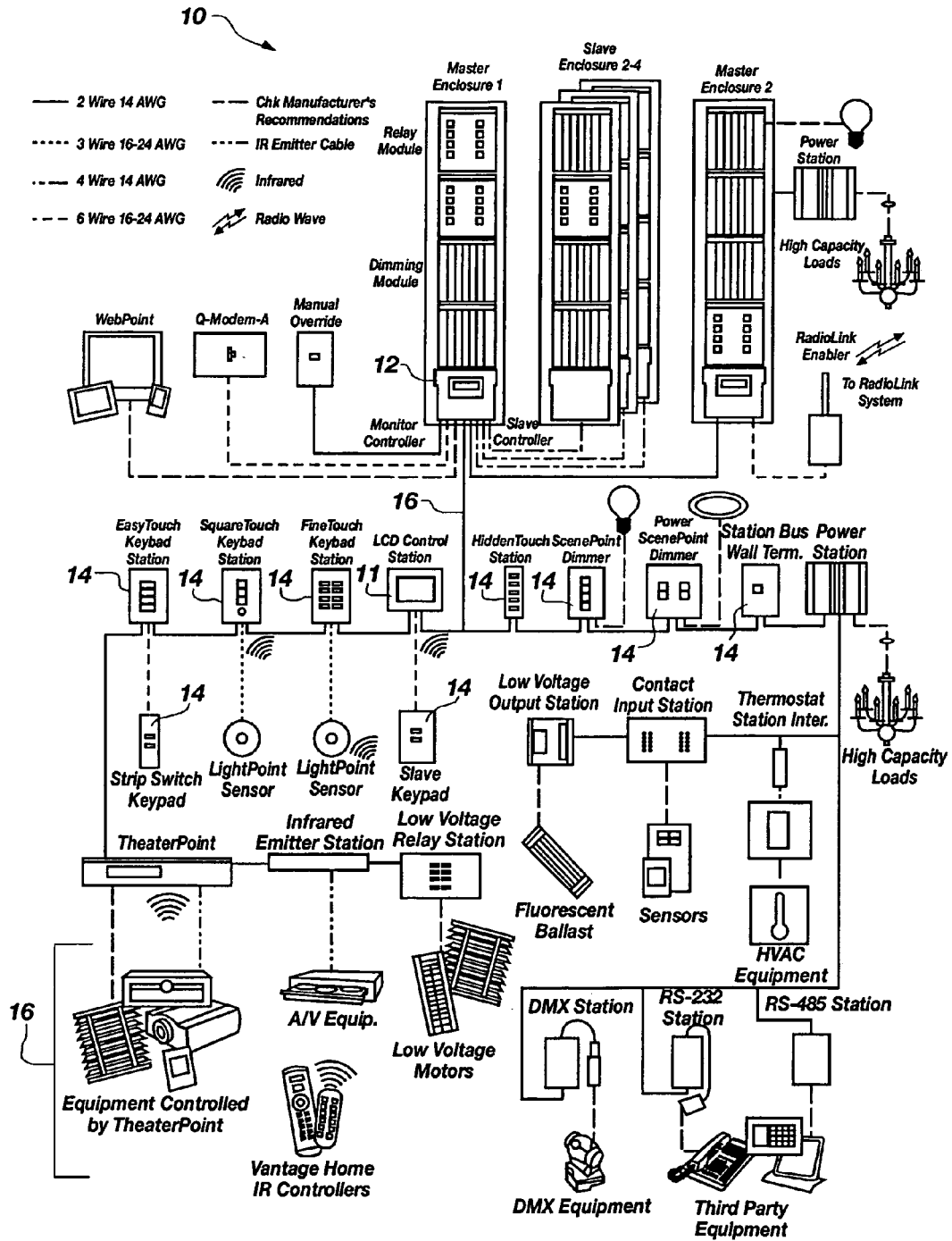
FIG. 1 illustrates one example of a home automation system.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

It must be noted that, as used in this specification and the appended claims, the singular forms "a," "an," and "the" include plural referents unless the context clearly dictates otherwise. In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps.

Referring now to FIG. 1, there is shown a home automation system 10 in which a display 11 may be used. It is to be understood that while the embodiments of the present invention are described herein as being utilized in conjunction with a home automation system, it is to be appreciated that the present invention is applicable to many different automation systems including residential and commercial automation systems and other types of automation systems.

In FIG. 1, the home automation system 10 comprises a master controller 12. The master controller 12 controls all of the electrical devices, known as loads, connected into the home automation system 10. These devices may include lights and other electrical devices typically found in a home. The system 10 also comprises a number of stations 14. Each station 14 may comprise one or more buttons. Each button may be programmed to control any load, or multiple loads, connected to the system 14.

The display 11 can be programmed to allow a user to control any of the electrical devices connected to the system 10. This may include home theater system components 16. The display 11 is usually located in a central room of a house such as a bedroom or kitchen. From this location, most if not all of the electrical devices can be controlled or monitored. The display 11 can also be programmed to display other information such as room temperature etc.

Figure 2:
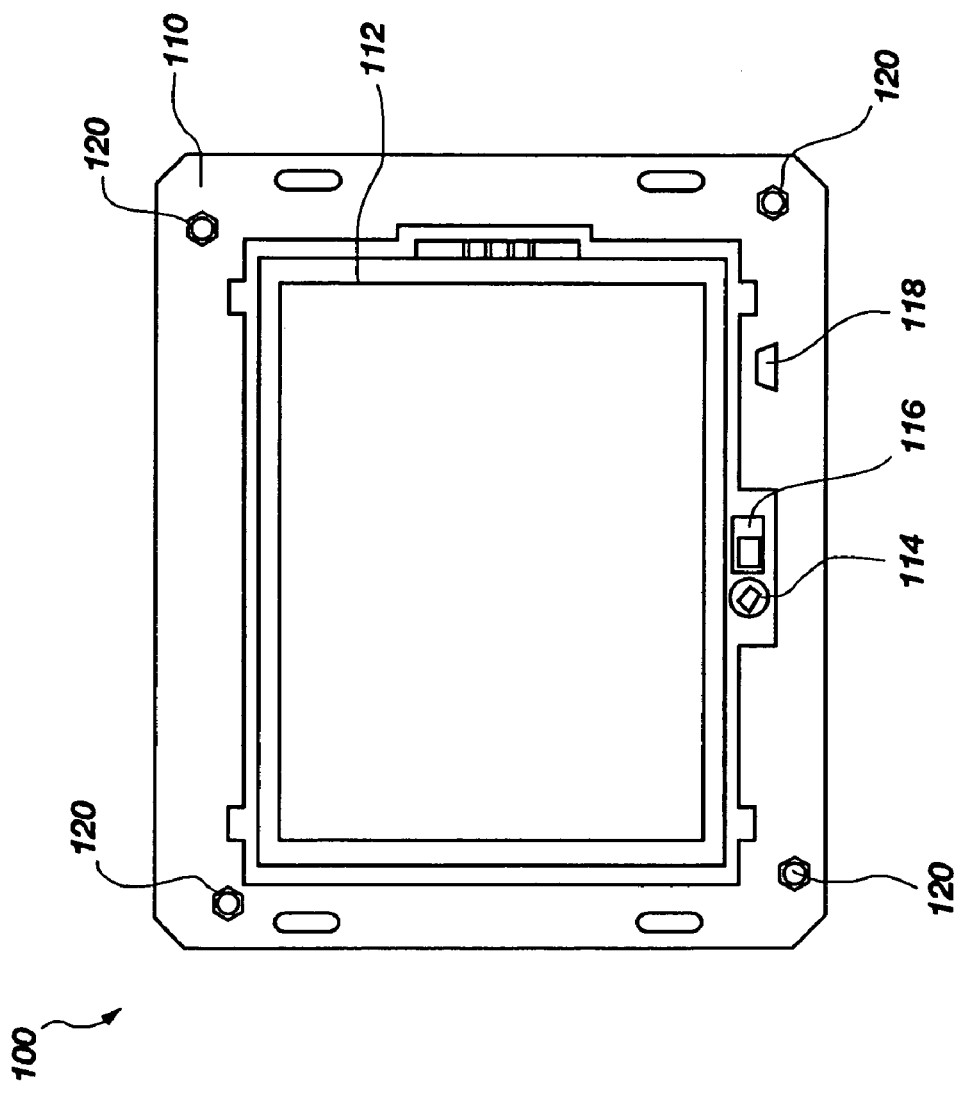
FIG. 2 provides a front view of one illustrative embodiment of the present invention.

Referring now to FIG. 2, there is shown one embodiment of a display 100 in accordance with the principles of the present invention. A housing 110 encases a screen 112. In addition, the housing 110 also comprises an integrated motion sensor 114, an IR receiver 116 and a communications port 118.

The screen 112 may be of any type. Preferably, the screen 112 is a 65,536 color, active matrix liquid crystal touch screen with a backlit display. The quarter VGA LCD 5.5 inch diagonal display is small enough to keep any area from feeling cluttered but versatile enough to fulfill the needs of almost any application.

The screen 112 displays menus, choices, buttons, sliders, etc. on a series of preprogrammed pages, which will be explained in detail below. A user can scroll through the different pages or make choices by "touching" the screen. Each touch represents a button push. Each button may control a load connected through a home automation system.

The motion sensor 114 preferably detects the proximity of a human being and activates a backlight for the screen 112. The backlight allows a user to see the items on the screen 112. The use of the motion sensor 114 saves energy as well as extending the rated life of the backlighting unit. It will be appreciated that this advantageously eliminates the need for a person to actually touch the screen in order to activate the screen. This is particularly advantageous at night where a person may not know the exact location of the screen. By simply moving into the proximity of the screen, the screen automatically illuminates, thereby allowing a person to easily locate the screen.

The IR receiver 116 accepts commands from a remote control to control loads connected to the home automation system. From the remote, it is possible to control any of the loads on the system 10 (FIG. 1).

The communications port 118 is used to download customized pages and other information to the display 100. The communications port 118 may be a Mini-B USB port. Programming of the customized pages may be done on a computer using a computer program. The pages are generally customized for each particular home in which the display 100 will be installed. As mention previously, through the pages, the display can control any of the electrical devices connected to the system 10 or display any status information, such as the status of the electrical device, i.e. on or off, or any information from other system, i.e. alarm systems, or from sensors, i.e. temperature readings. Moreover, the pages can be used to control lighting, home theater components (DVD, TV, projectors), audio equipment and other electrical devices on a system.

For example, programming the pages may be conveniently accomplished by simply connecting a laptop to the screen through the integrated communications port 118. Through this connection programming software allows the installer to quickly and easily create custom interfaces. Generally, the programming software comprises a library of interface components that is available to the installer or custom images can be easily imported and connected to specific actions. The programming and screen customization should be so simple that little or no training is needed.

Wall fasteners 120 allow the display to be mounted on a wall. Wall fasteners may include lag bolts, screws, nails etc.

Figure 3:
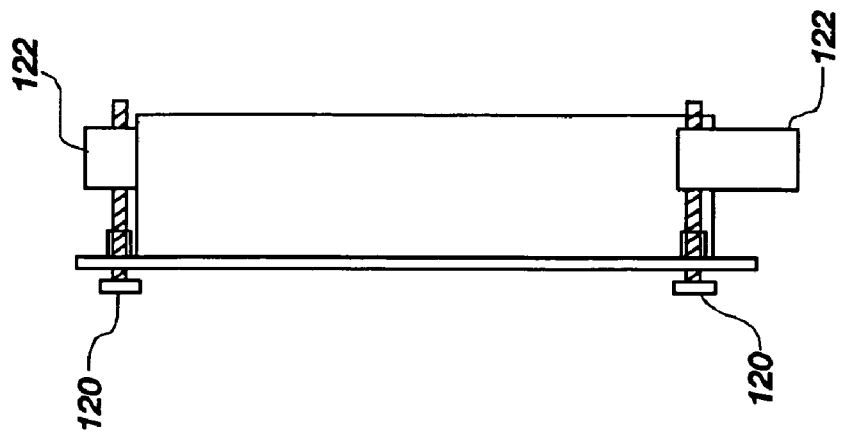
FIG. 3 shows a side view of the illustrative embodiment of the present invention.
Figure 5:
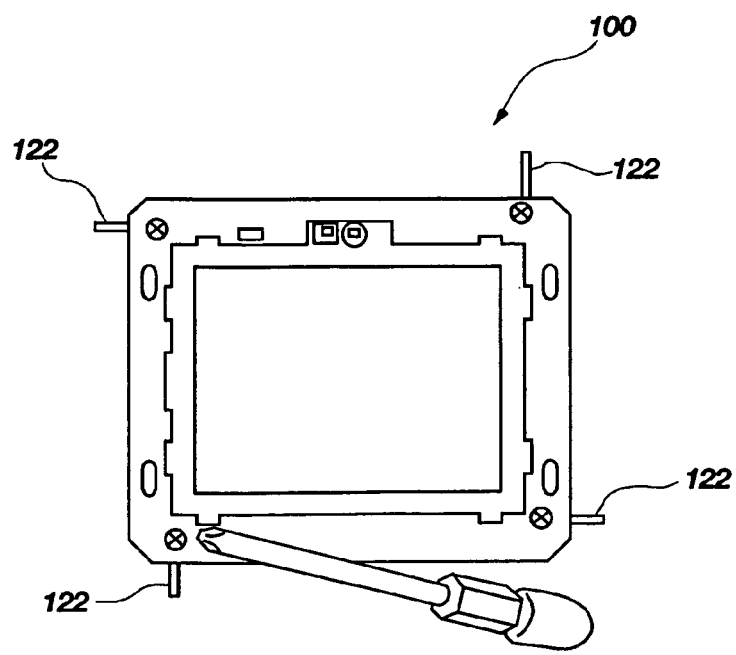
FIG. 5 shows a view of mounting wings used to secure the illustrative embodiment to a wall.

FIG. 3 illustrates a side view of the display 100. In this embodiment, the wall fasteners 120 comprise mounting wings 122. Once a hole in the wall has been cut, the display 100 is inserted into the hole. The mounting wings 120 are then deployed to hold the display 100 in place as can be seen in FIG. 5.

Figure 4:
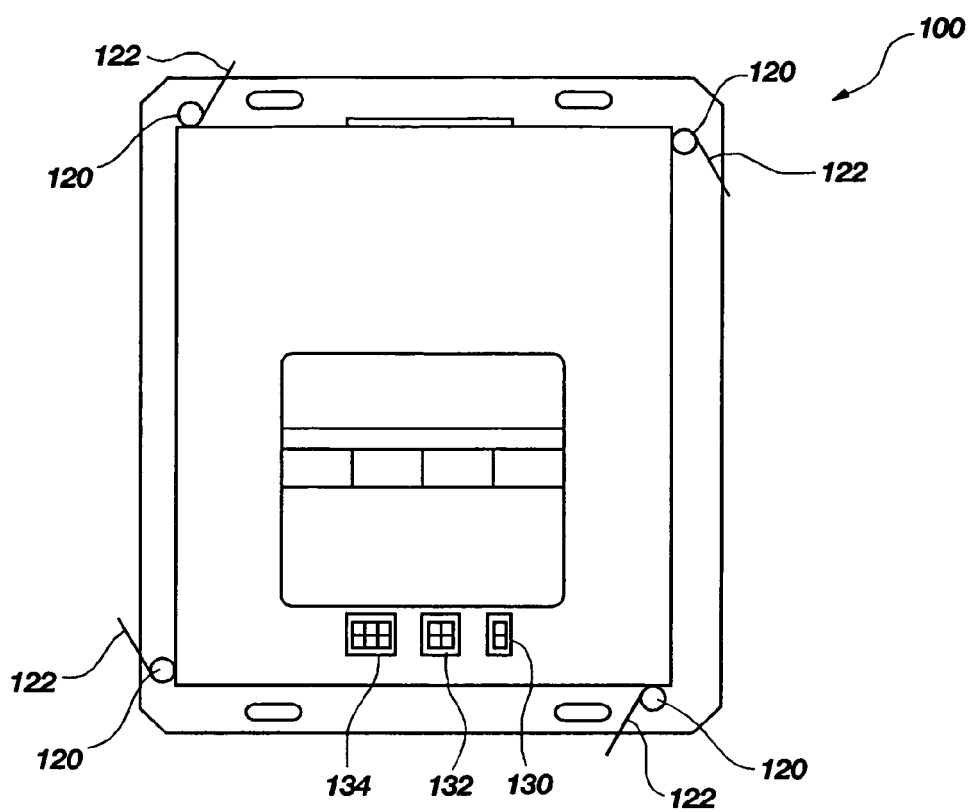
FIG. 4 shows a back view of the illustrative embodiment of the present invention.

FIG. 4 illustrates a back view of the embodiment represented in FIGS. 2 and 3. A station bus 130, an external power input 132, and auxiliary connections 134 are shown. Each of these will be explained below.

The station bus 130 allows the display to be connected to the system 10 (FIG. 1). In one illustrative embodiment, the bus is simply a two-wire bus. The station bus 130 allows the display 100 to have two-way communication with the master controller 10 (see FIG. 1). In one mode of operation, the display 100 is powered through the station bus 130.

The external power input 132 allows an external power supply to be used to power the display 100. In one mode of operation, the display 100 may operate on power supplied over the station bus 130. However, while acceptable, this reduces the power available for other devices on the system 10. This reduction in power limits the number of other devices that can be connected to the system 10. The use of an external power supply therefore does not deplete system power.

The auxiliary connections 134 may be used to attach ancillary devices. These devices may include light sensors, infrared sensors, motion sensor, etc., all of which can communicate through the auxiliary connector. The auxiliary connections 134 may also include contact inputs. The system 10 may be programmed to execute a command or a series of commands upon data received through the auxiliary connections 134.

Figure 6:
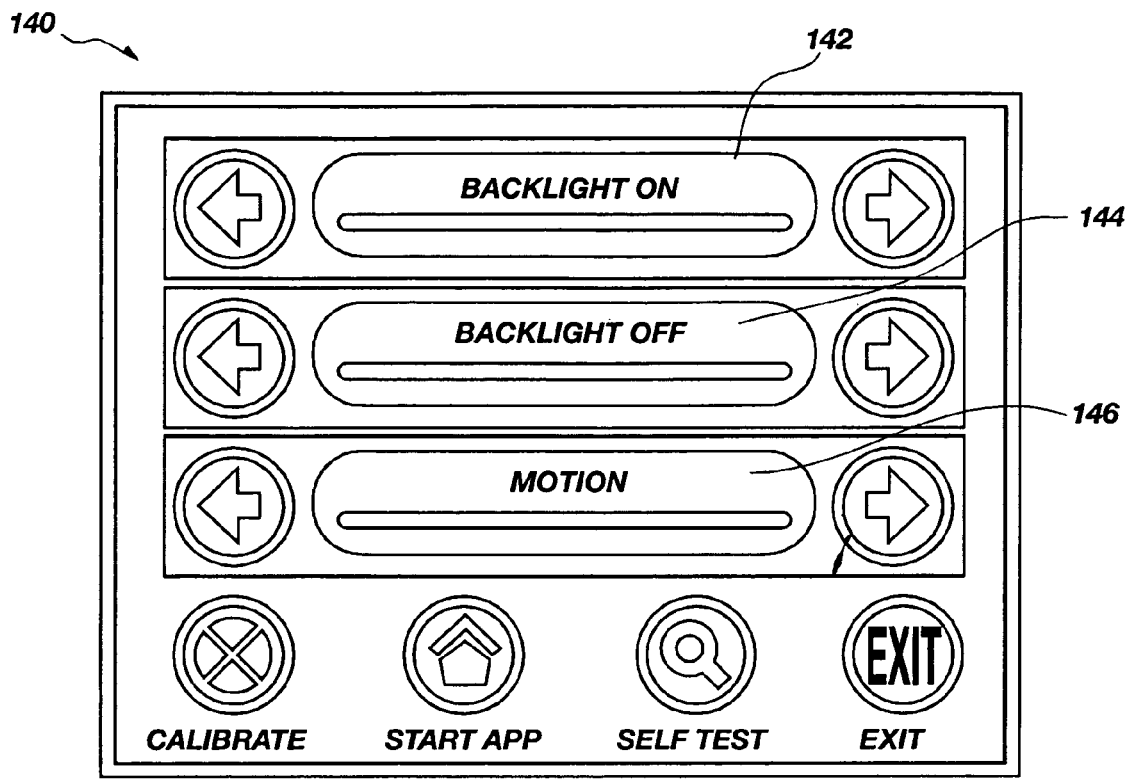
FIG. 6 shows an illustrative example of a page that can be displayed on an embodiment of the present invention.

The display 100 may also have setup pages for controlling various functions. Some of these functions include backlighting level when the backlight is either on or off and motion sensor sensitivity. An example of one such page 140 is illustrated in FIG. 6.

The backlight levels may be adjusted through control 142 so that the light is at a specific level when the screen is on (meaning that it has been touched or that the proximity detector has been tripped) and a specific level when it is off (when it hasn't been touched for 15 to 600 seconds, and the proximity detector hasn't been tripped) through control 144.

The motion sensor 114 is used to illuminate the backlight when someone approaches or passes by the station. The sensitivity level may be adjusted by tapping the motion sensor left or right buttons on control 146. When the motion sensor level is set all the way to the left or zero, the backlight will not respond to motion, only to touch.

Figure 7:
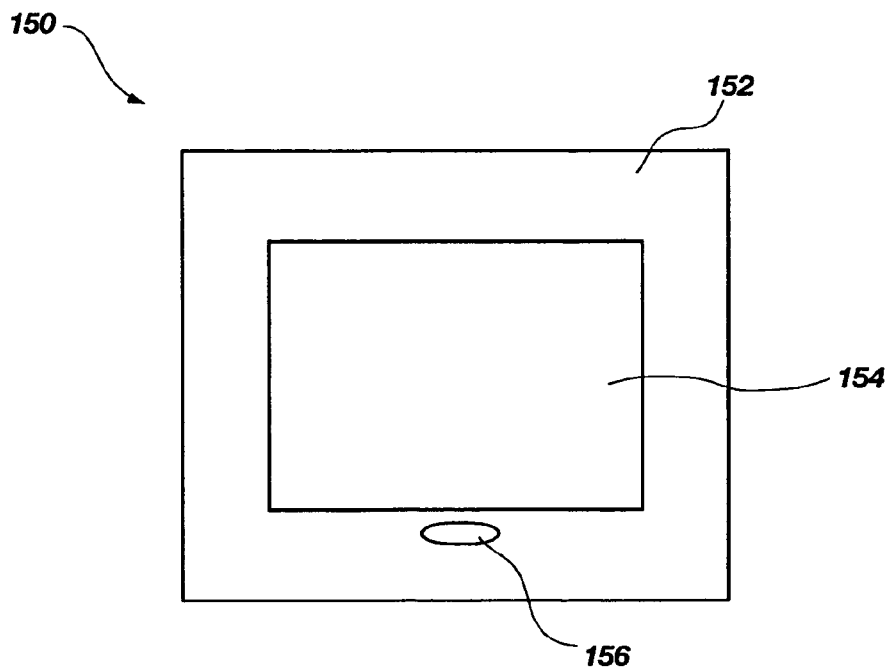
FIG. 7 shows one illustrative embodiment of a faceplate.

A faceplate 150 is shown if FIG. 7. The faceplate 150 comprises a frame 152 having an opening 154 for the screen 112. The frame 152 further comprises an aperture 156 for allowing the motion sensor 114 to detect movement. In addition, the aperture 156 may allow IR signals to pass to an IR receiver 116, if present.

Figure 8:
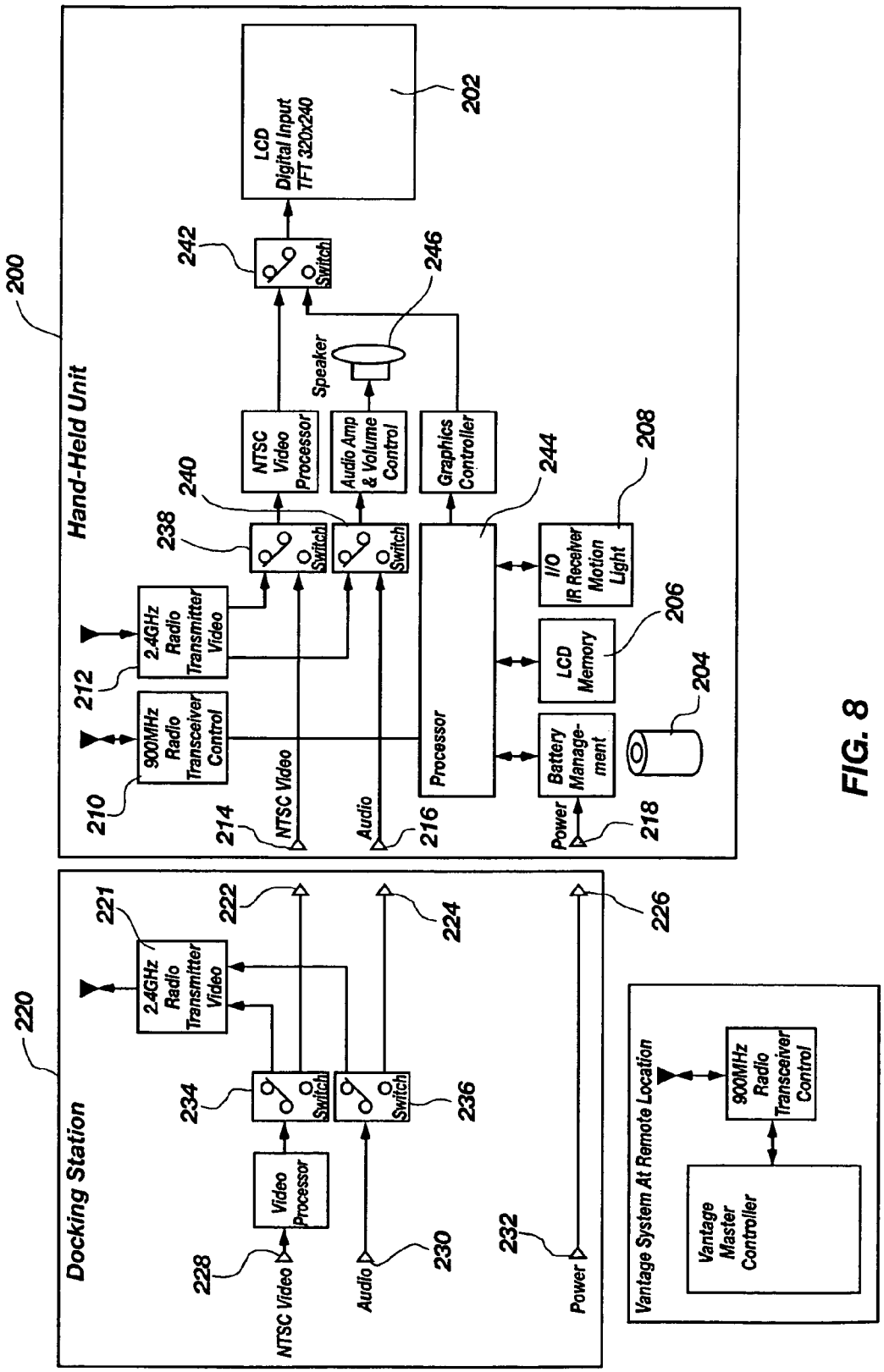
FIG. 8 illustrates a block diagram of a portable display and a docking station.
Figure 9A:
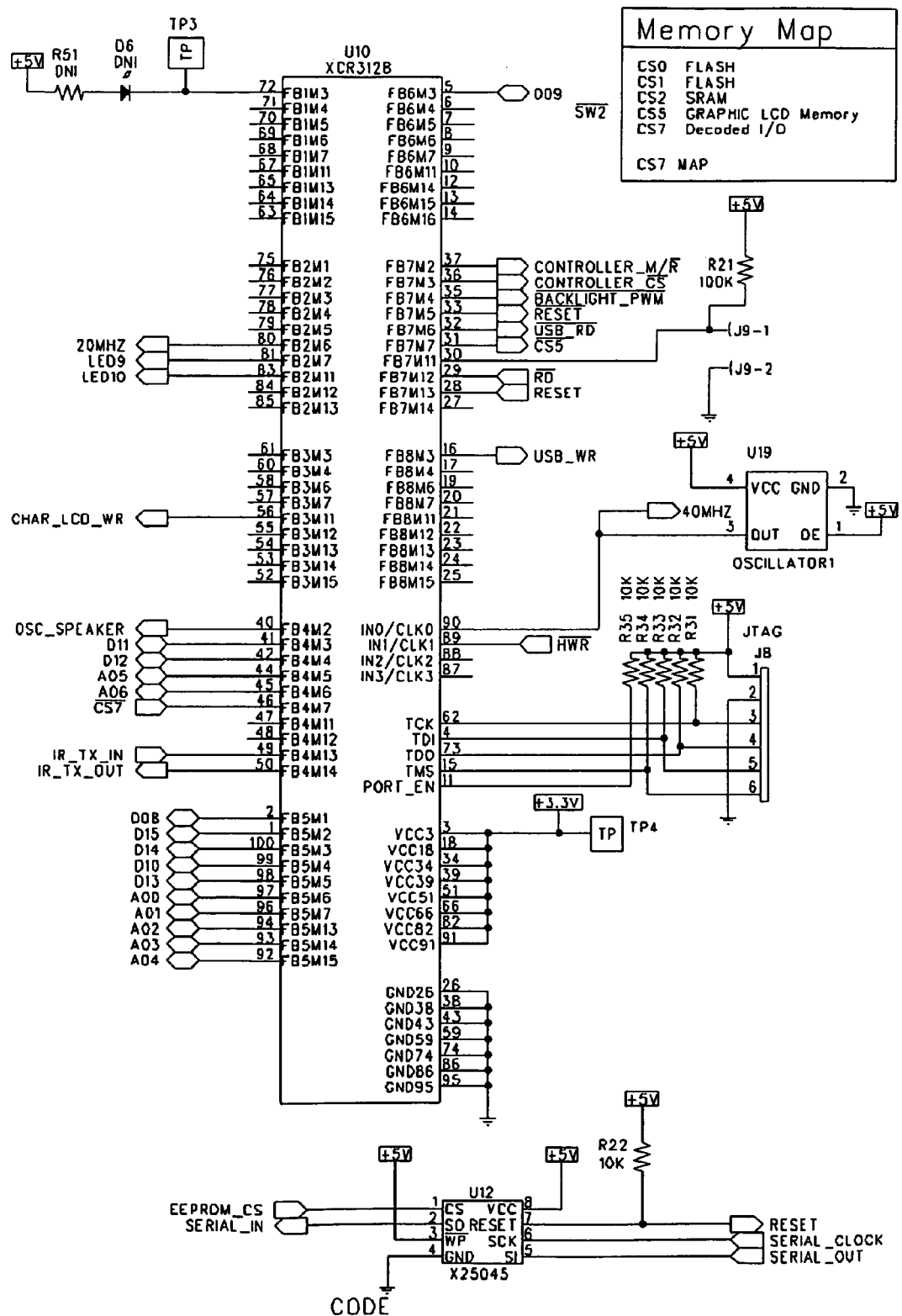
FIGS. 9A-9F illustrate a schematic diagram for one illustrative embodiment of the present invention.
Figure 9B:
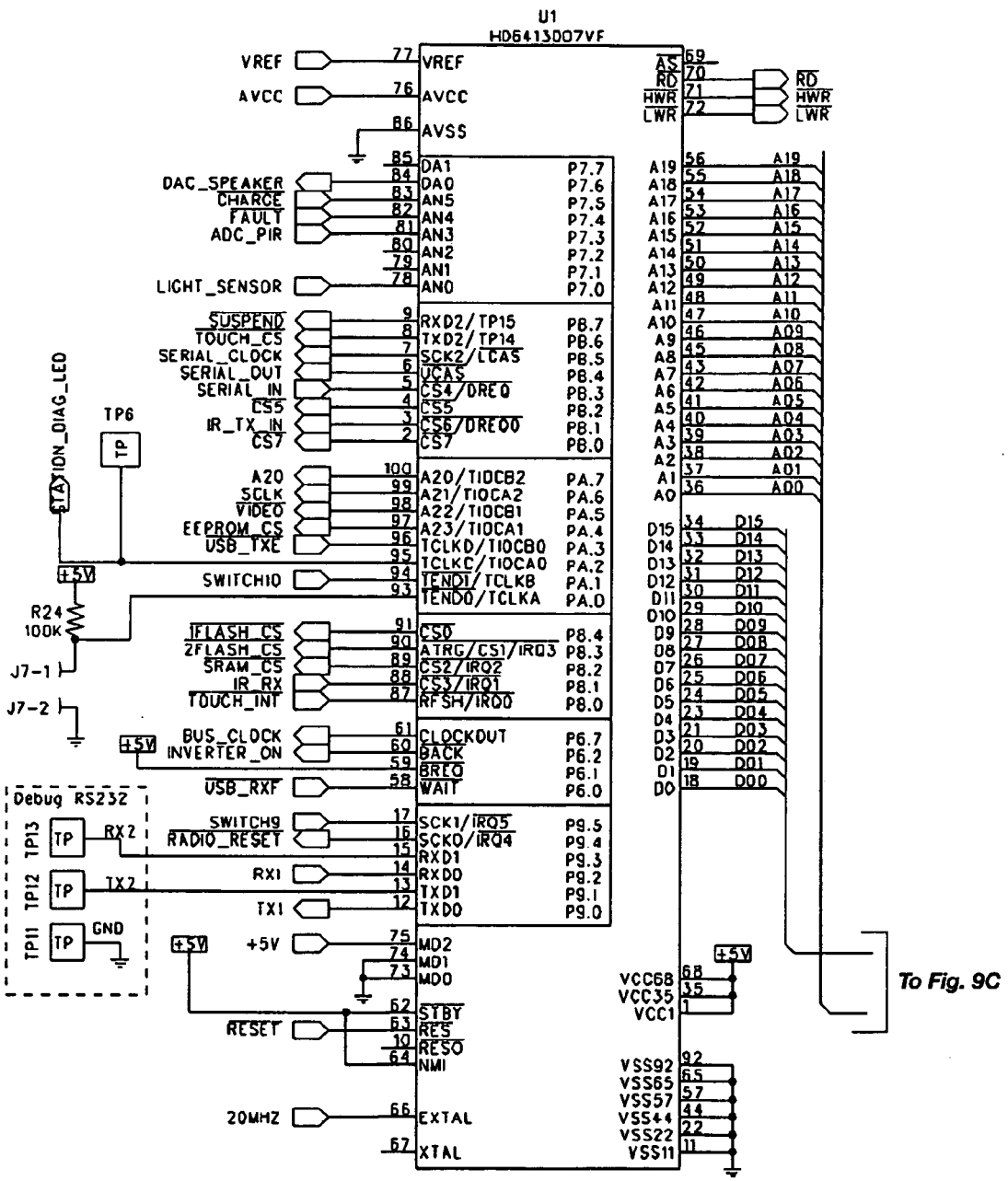
Figure 9C:
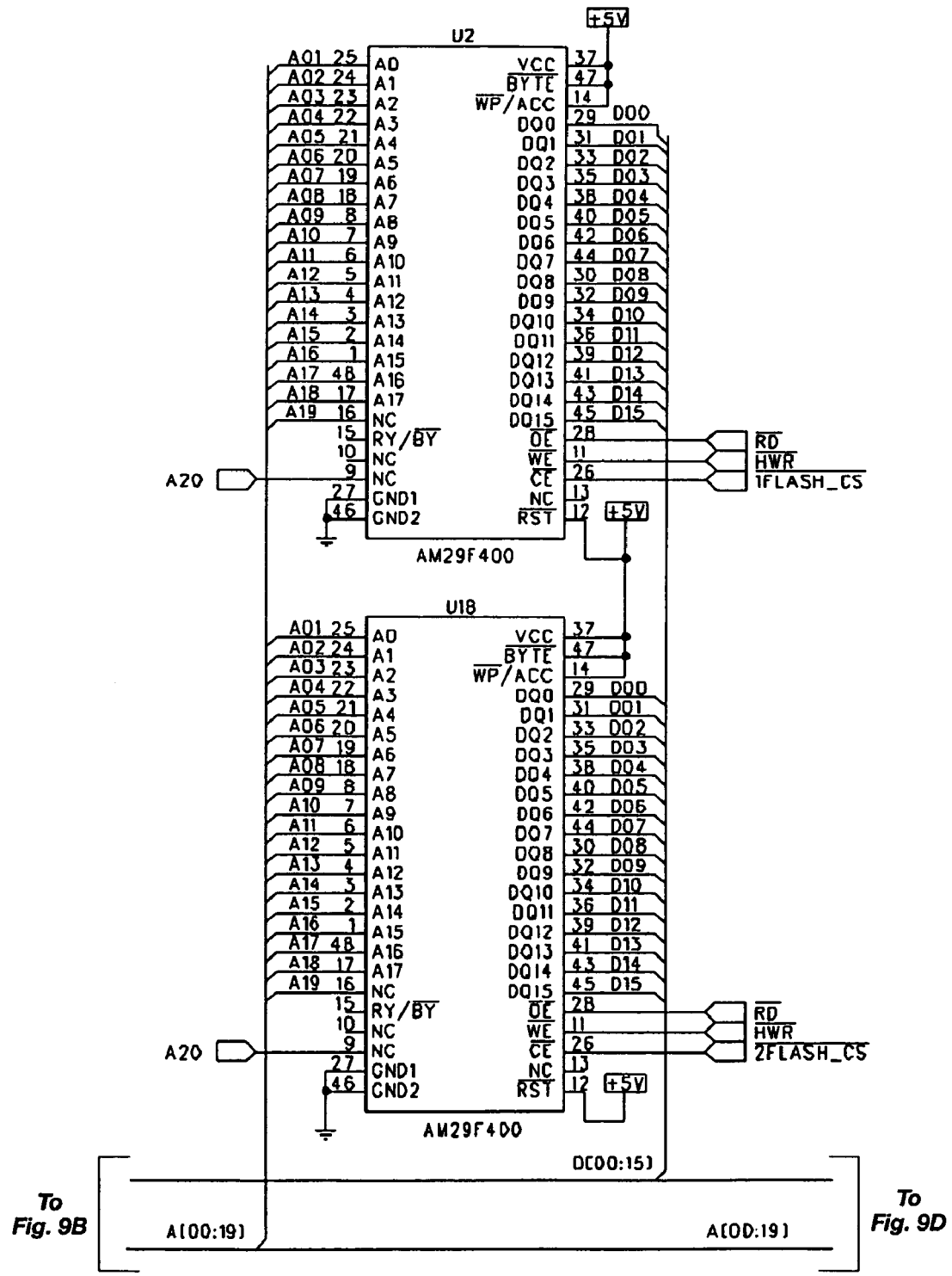
Figure 9D:
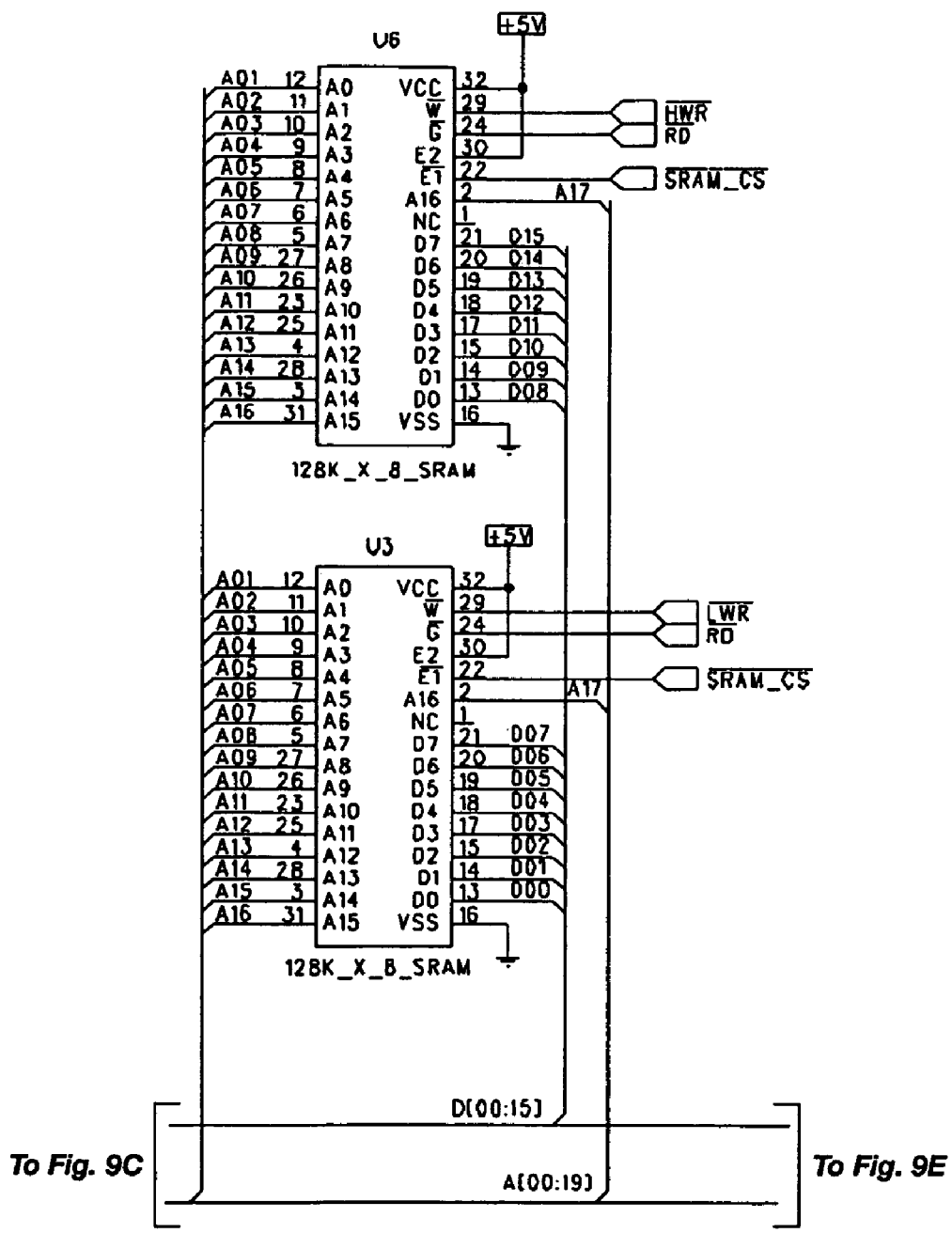
Figure 9E:
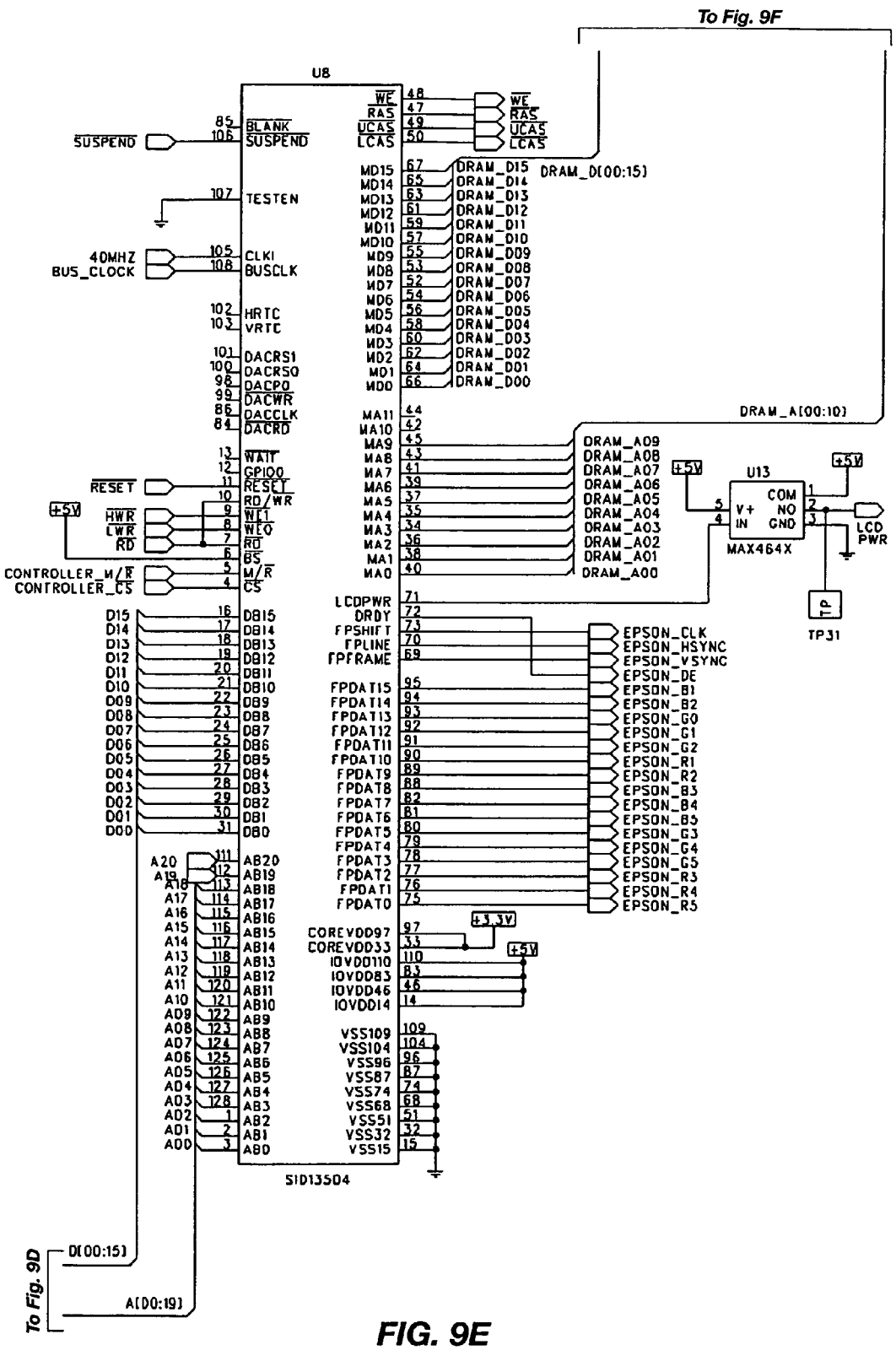
Figure 9F:
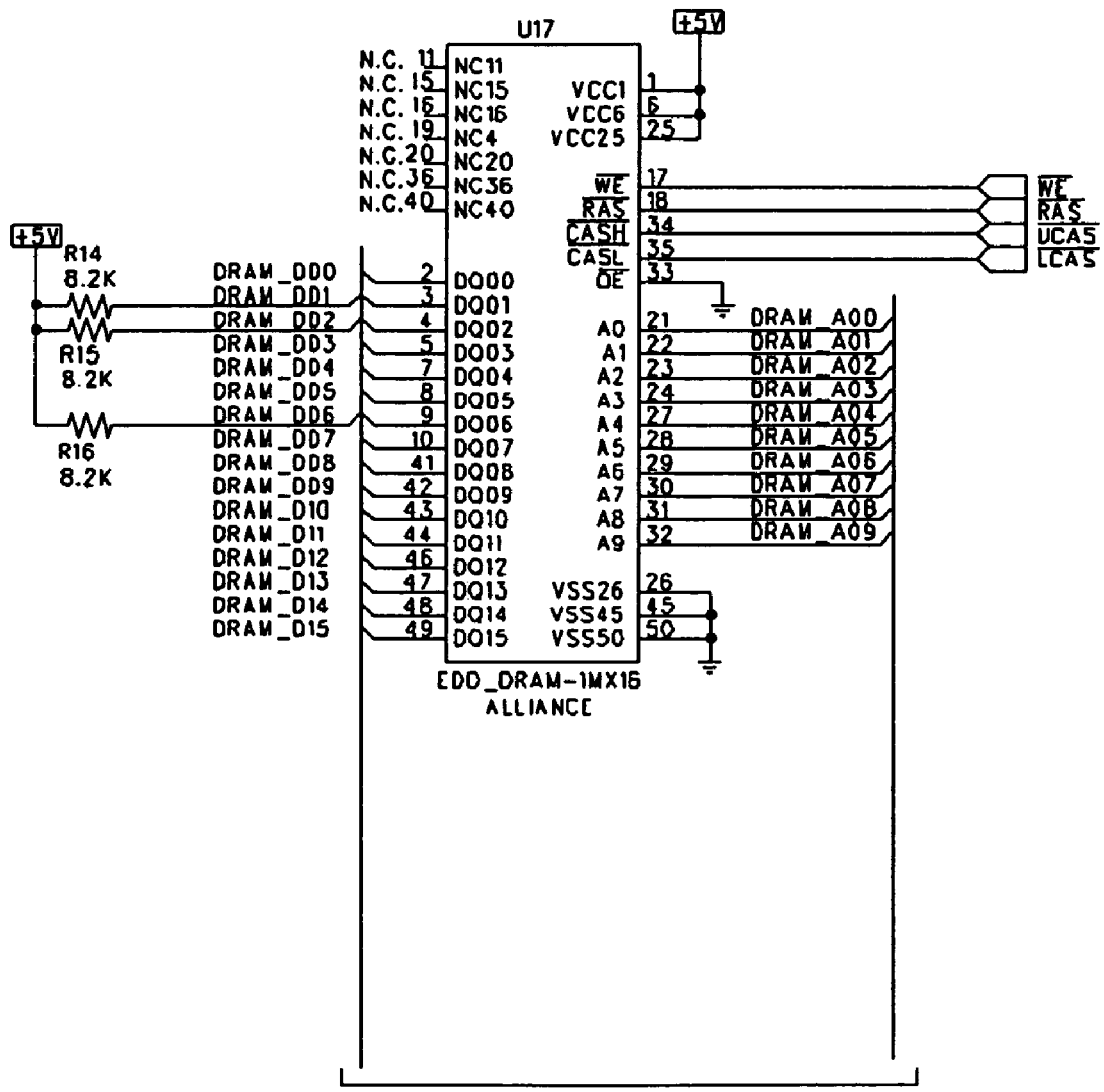
Figure 10A:
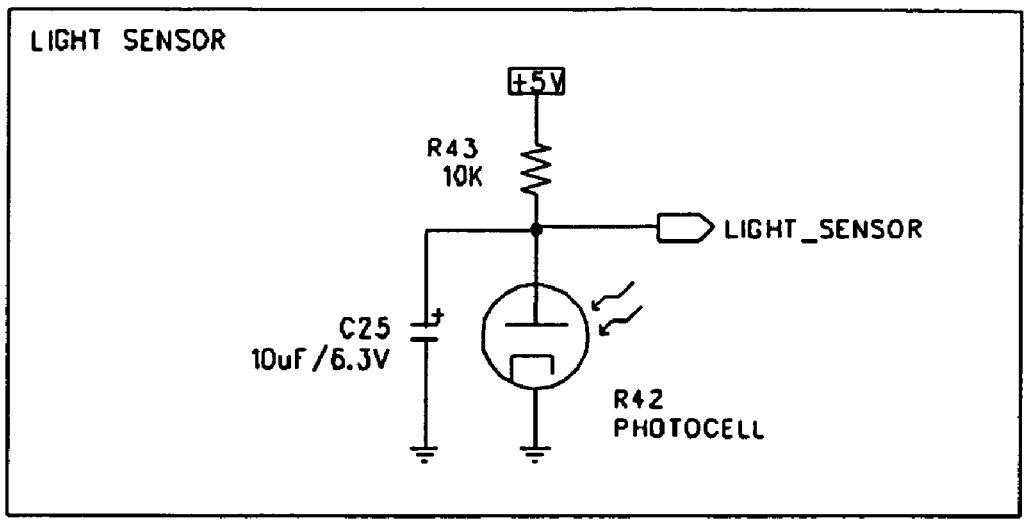
FIGS. 10A-10H illustrate a schematic diagram for one illustrative embodiment of the present invention.
Figure 10A:
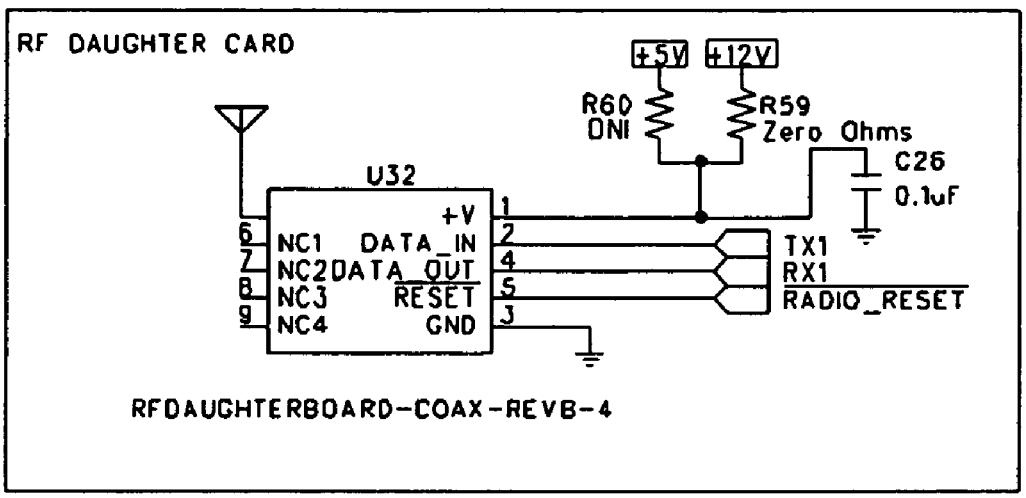
Figure 10A:
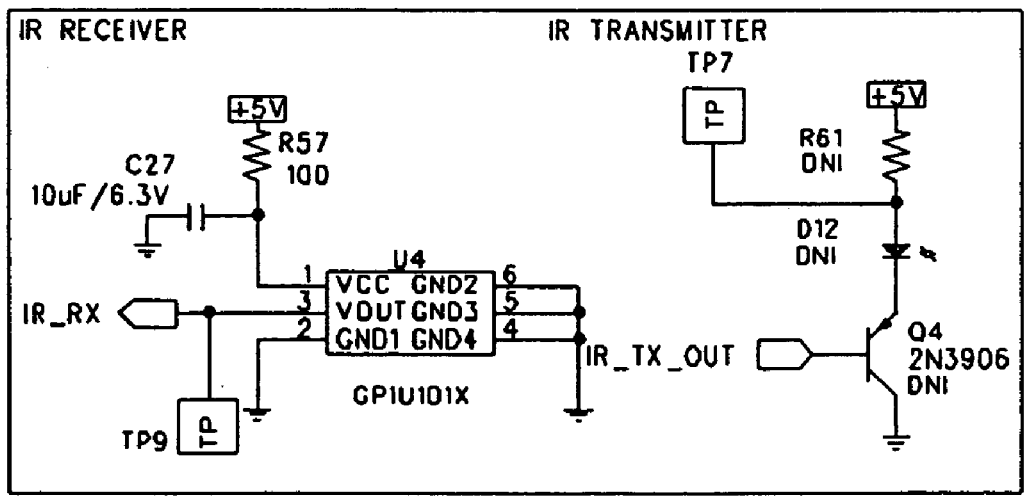
Figure 10B:
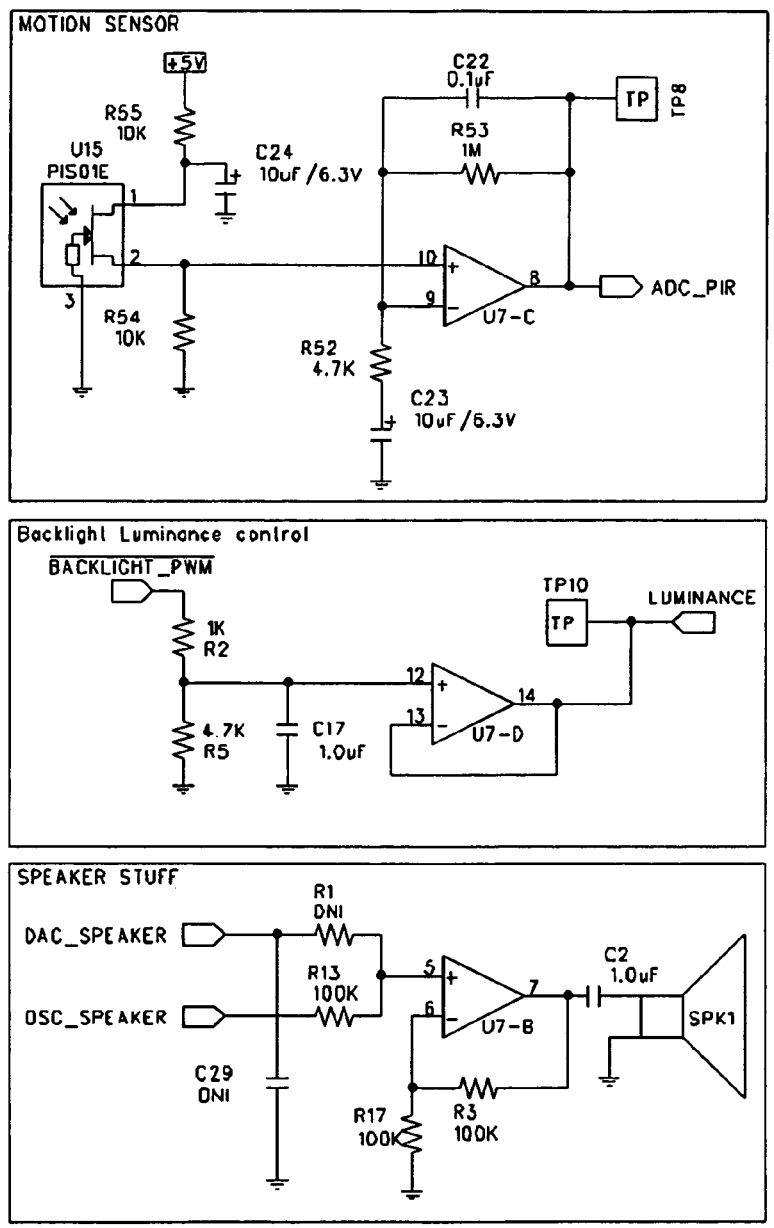
Figure 10B:
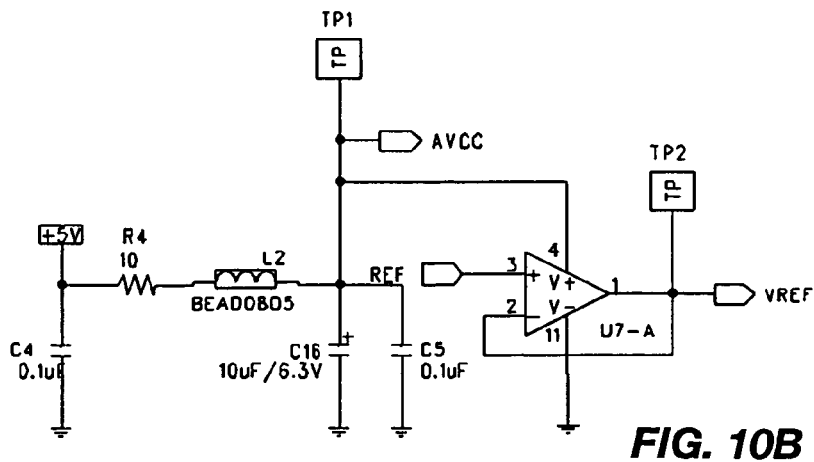
Figure 10C:
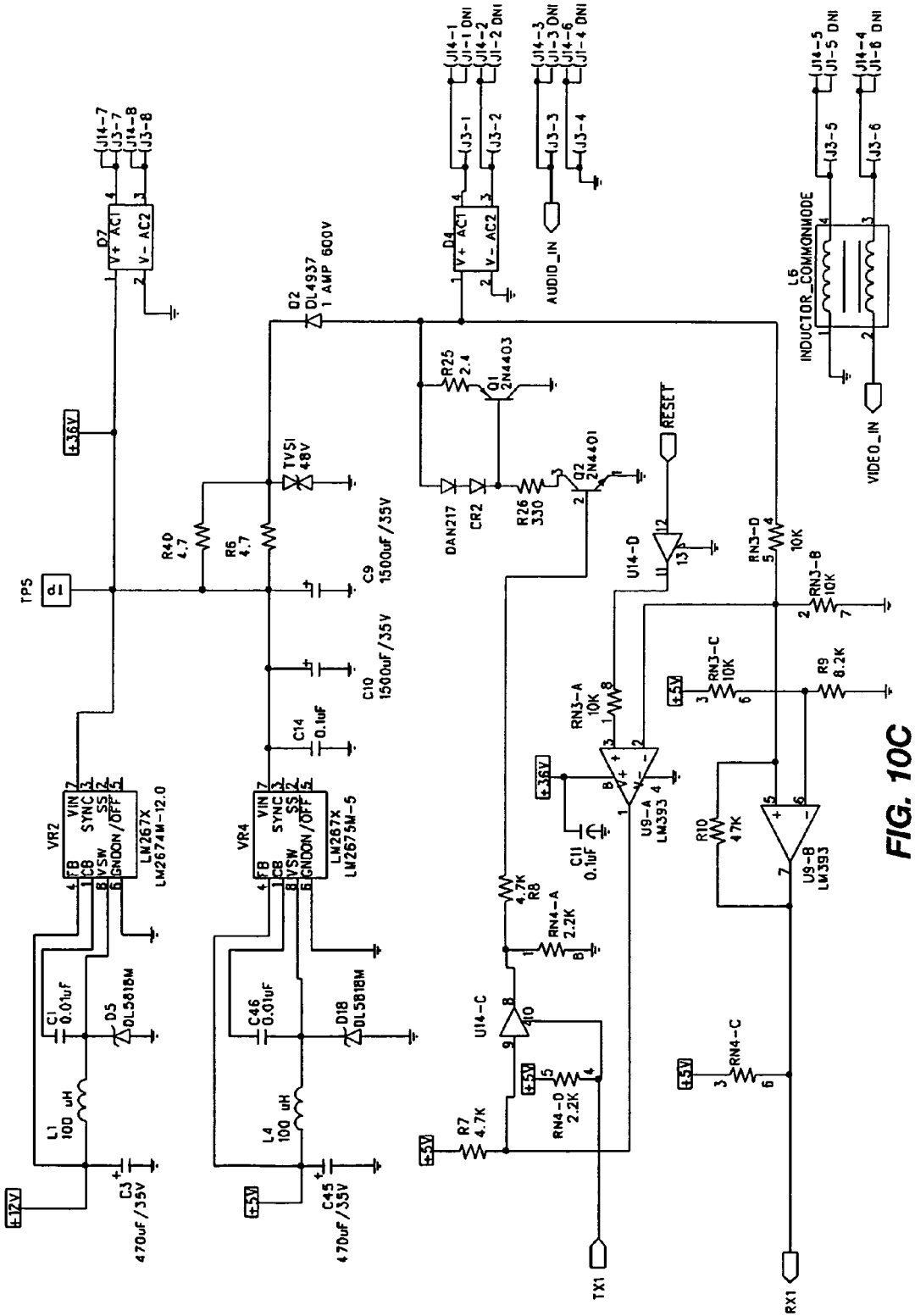
Figure 10D:
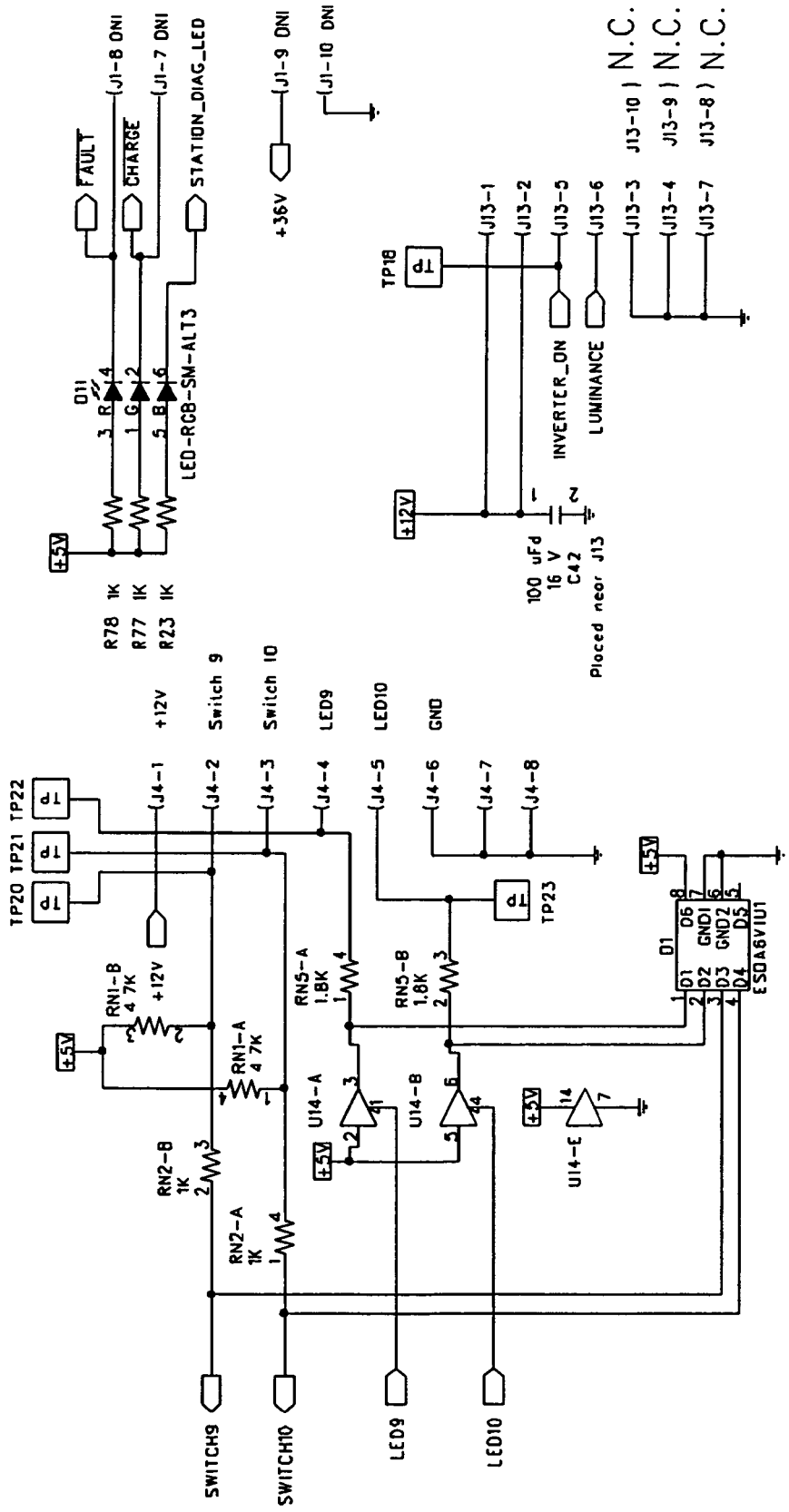
Figure 10E:
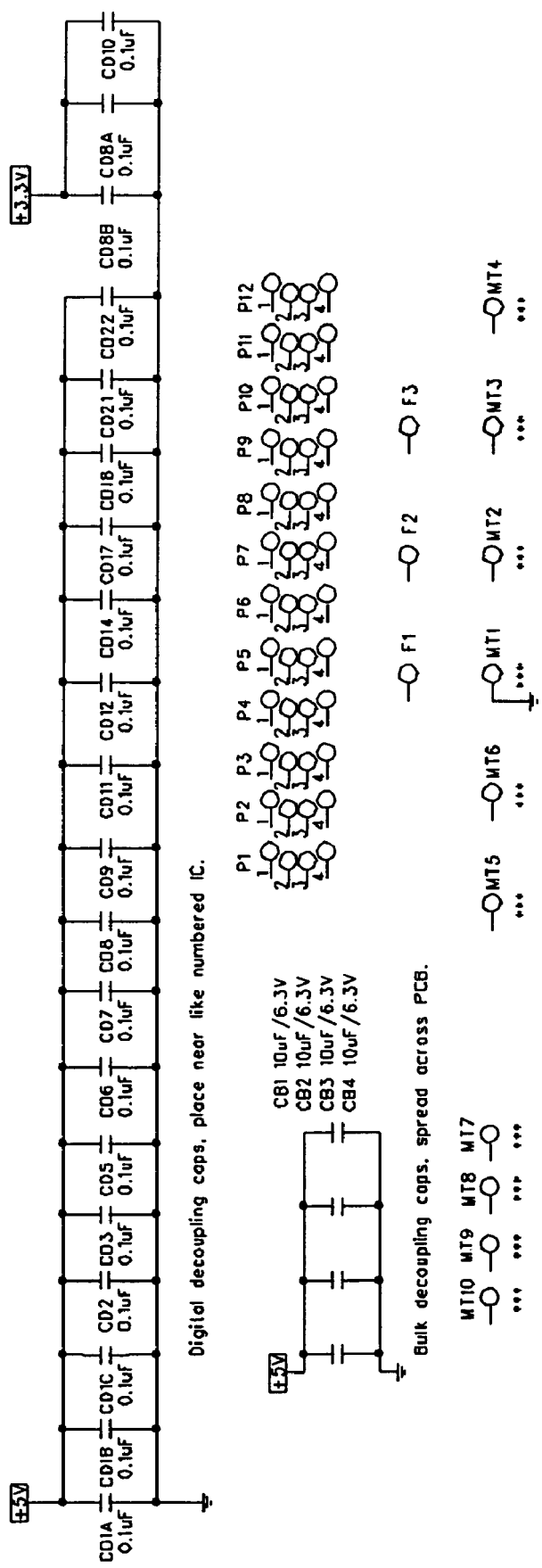
Figure 10F:
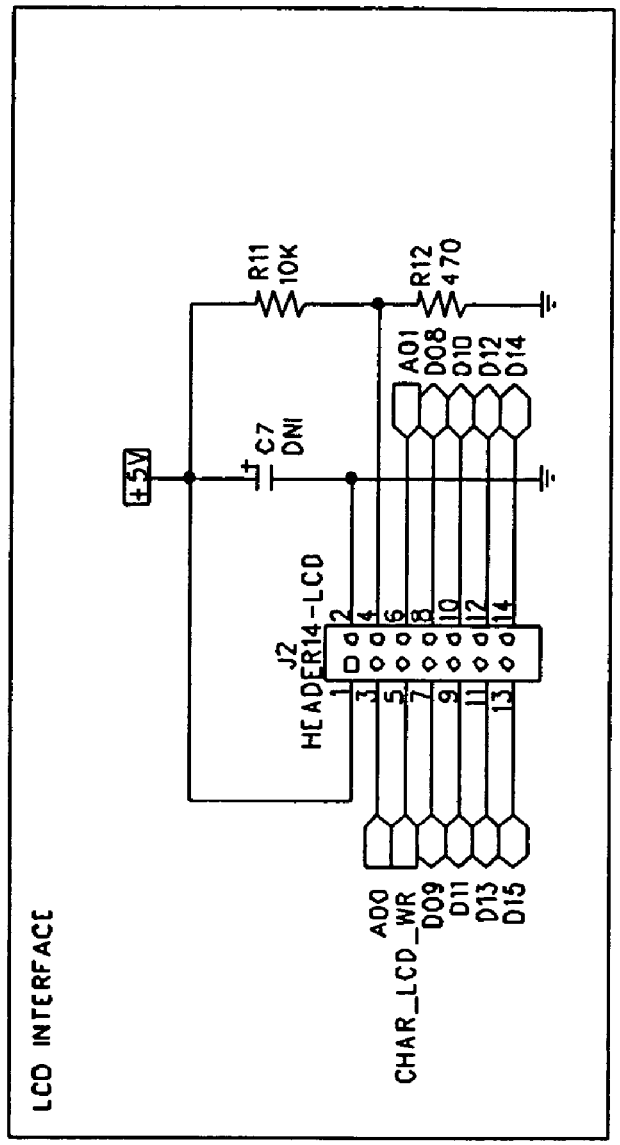
Figure 10G:
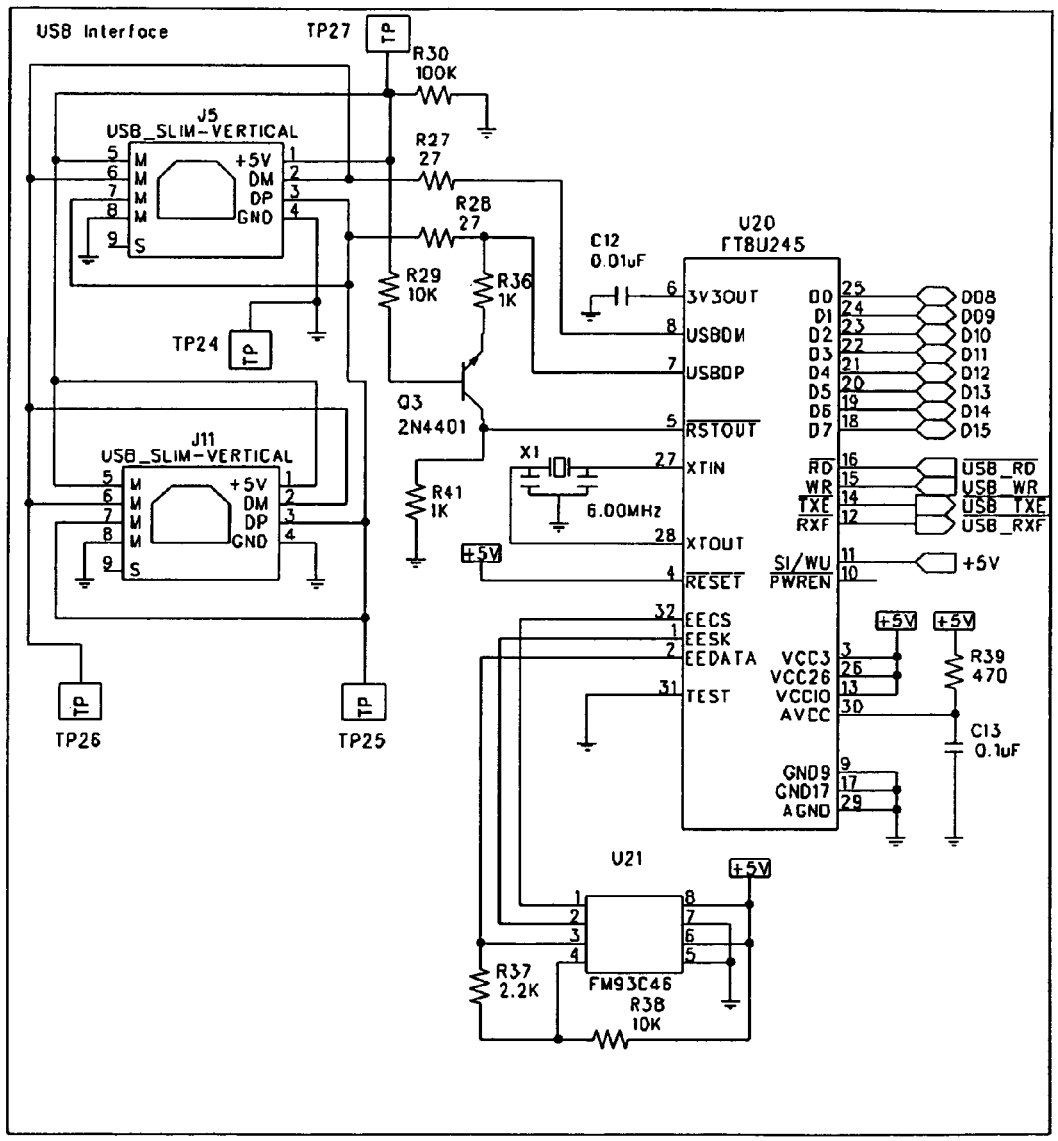
Figure 10H:
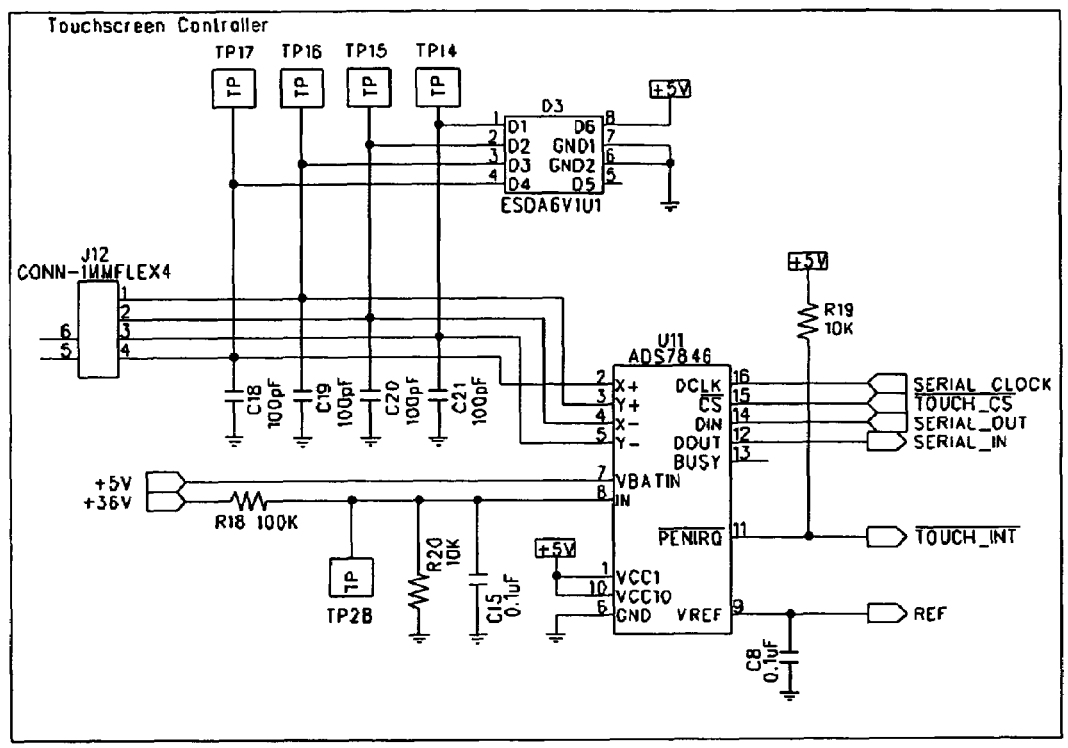
Figure 11A:
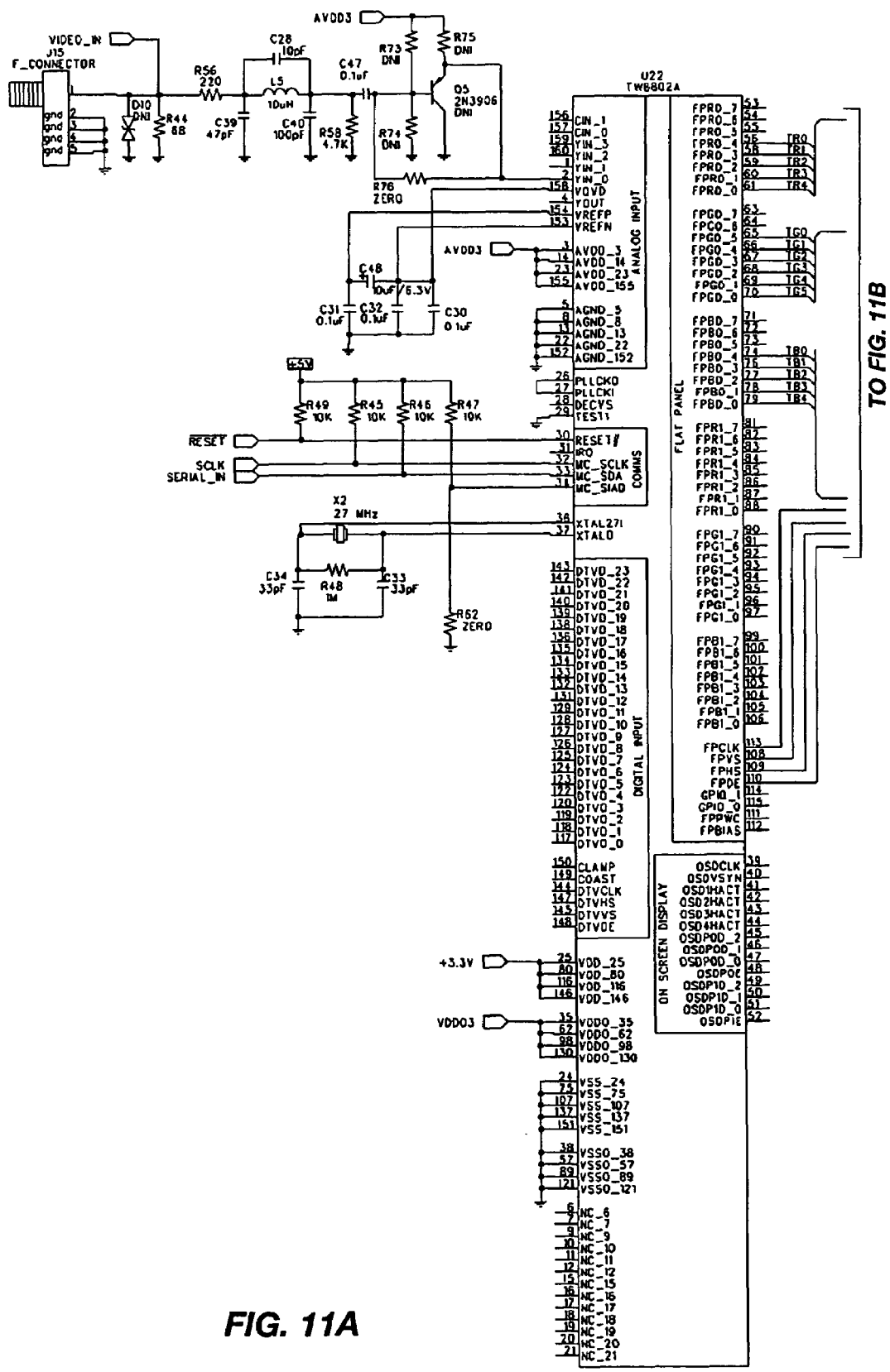
FIGS. 11A-11D illustrate a schematic diagram for one illustrative embodiment of the present invention.
Figure 11B:
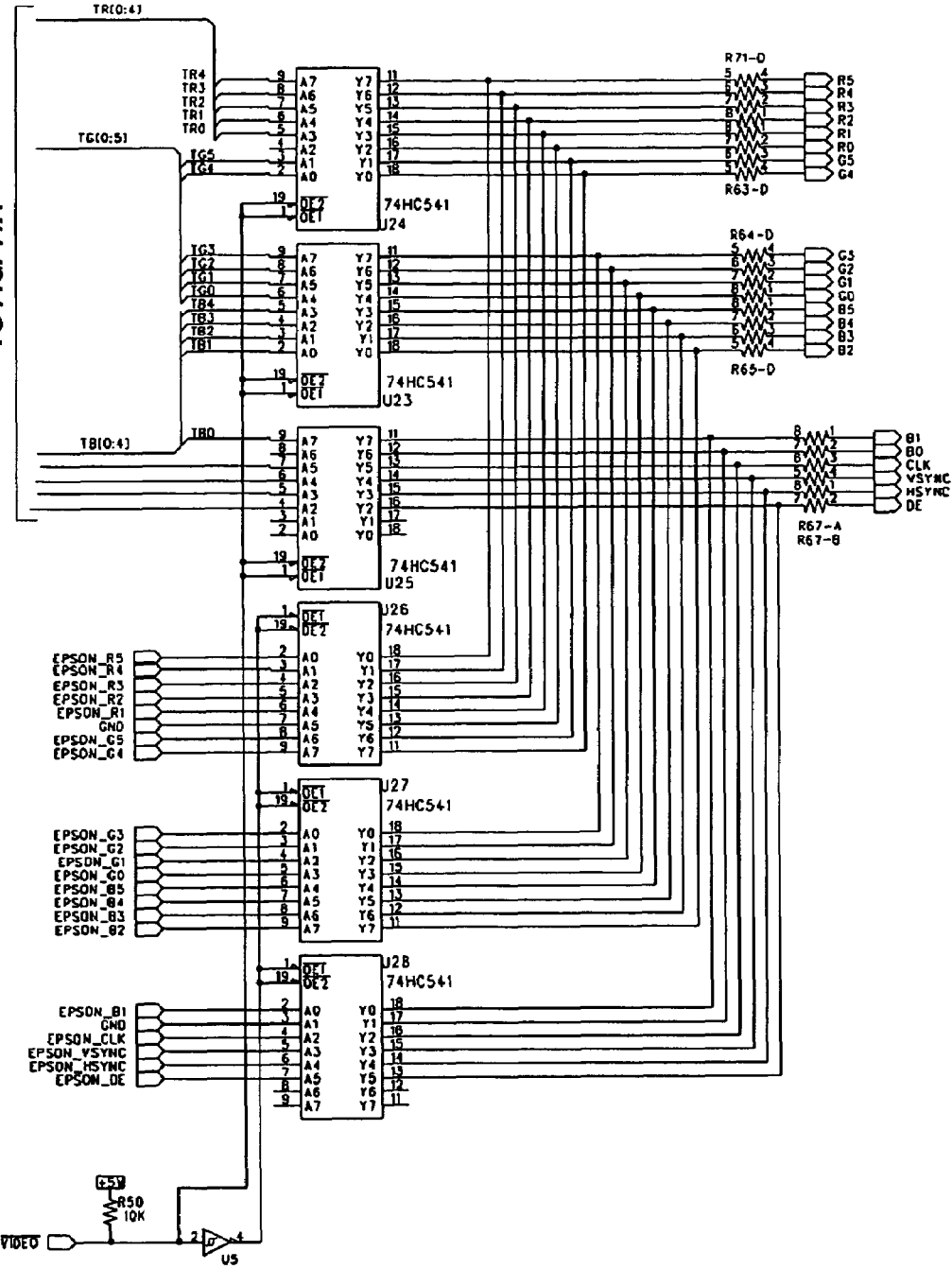
Figure 11C:
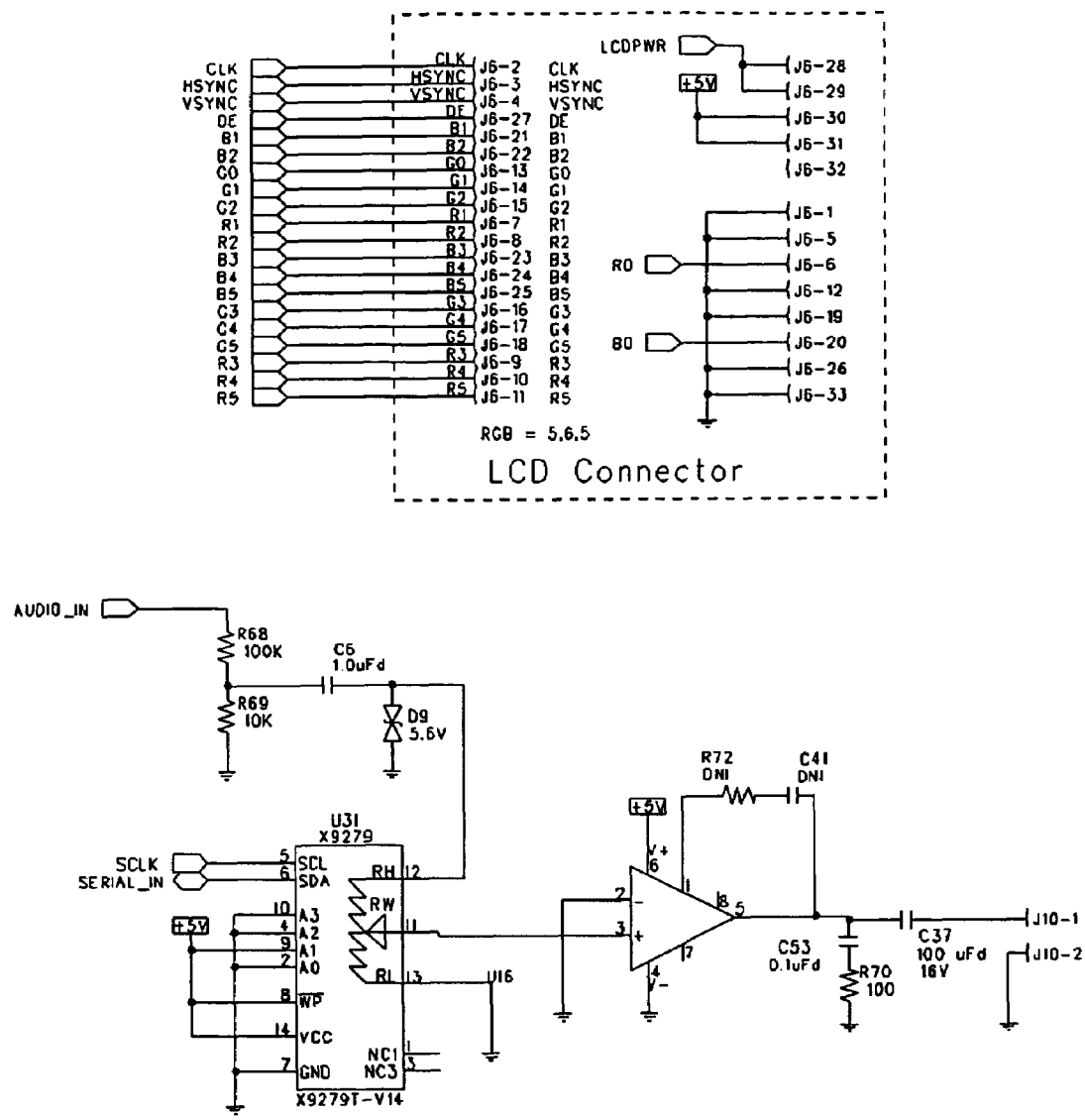
Figure 11D:
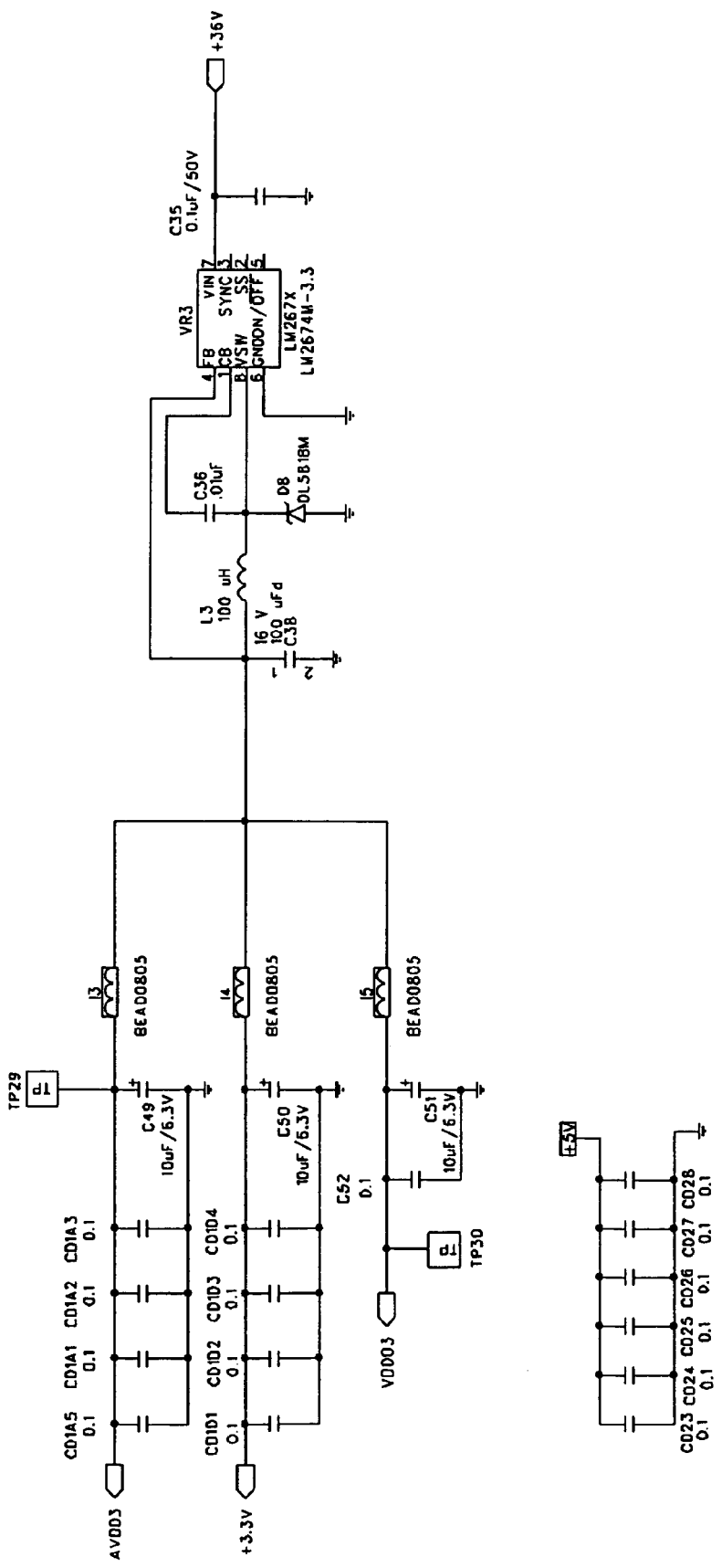
Figure 12A:
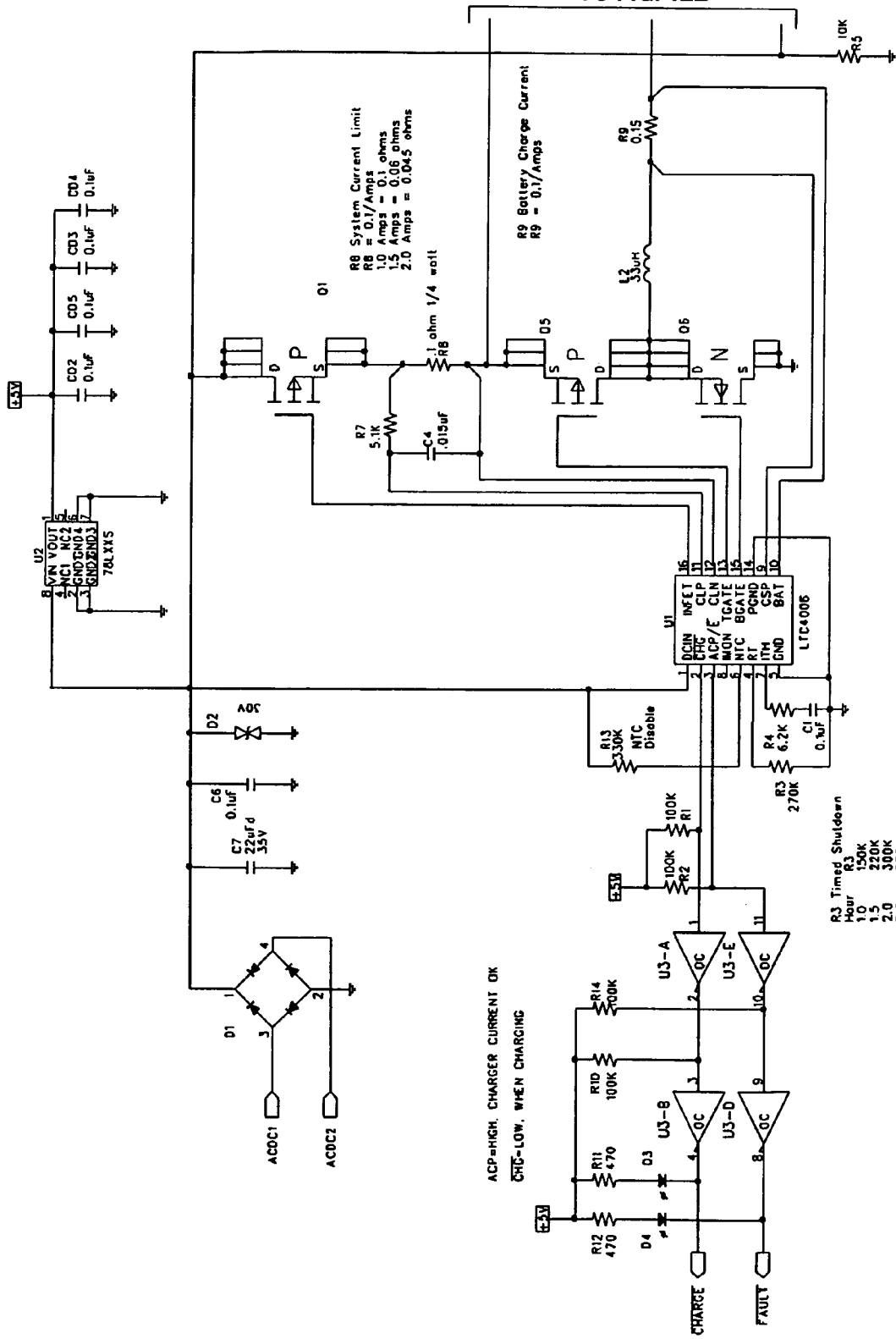
FIGS. 12A and 12B illustrates a schematic diagram for one illustrative embodiment of the present invention.
Figure 12B:
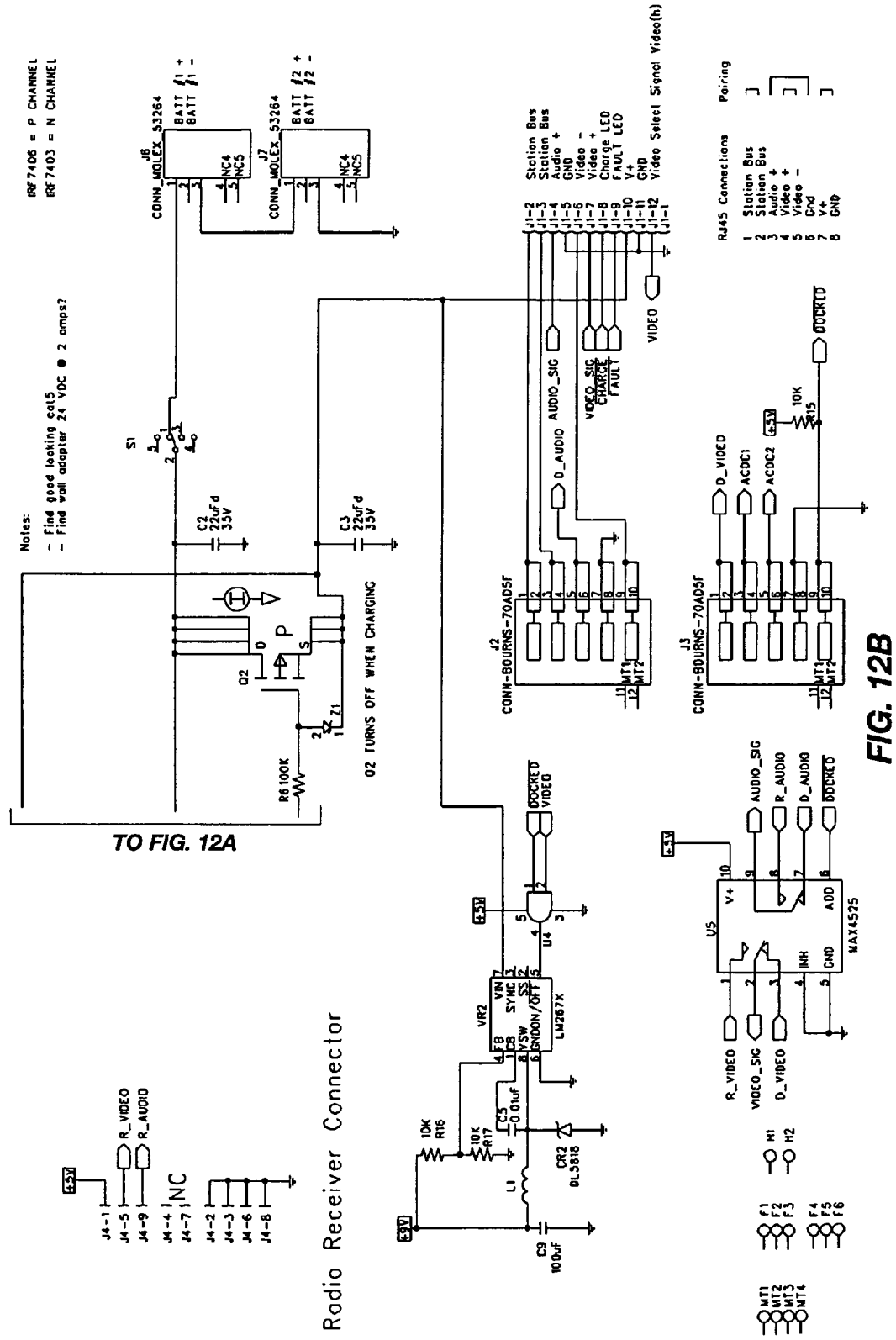
Figure 13A:
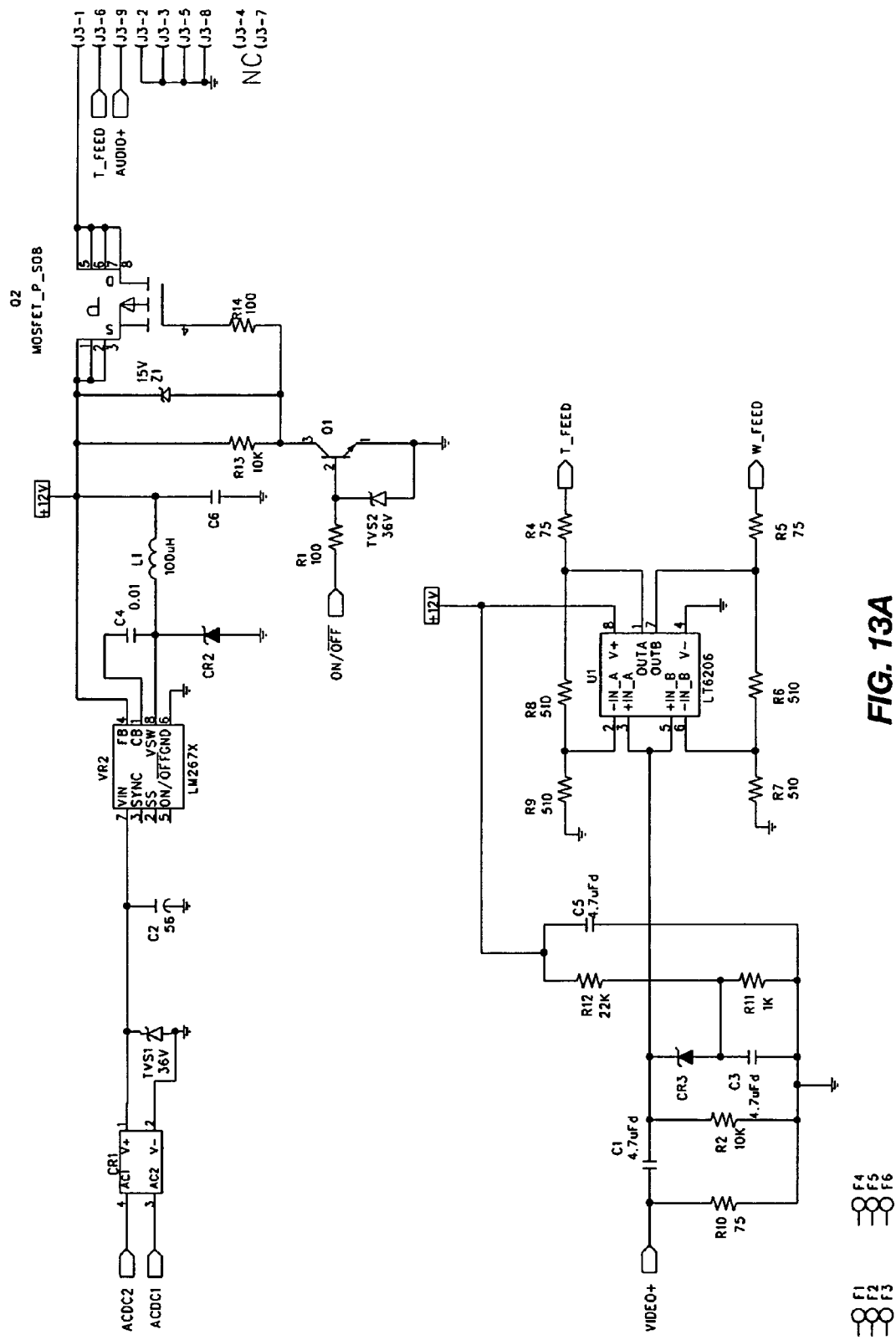
FIGS. 13A and 13B illustrate a schematic diagram for one illustrative embodiment of the present invention.
Figure 13B:
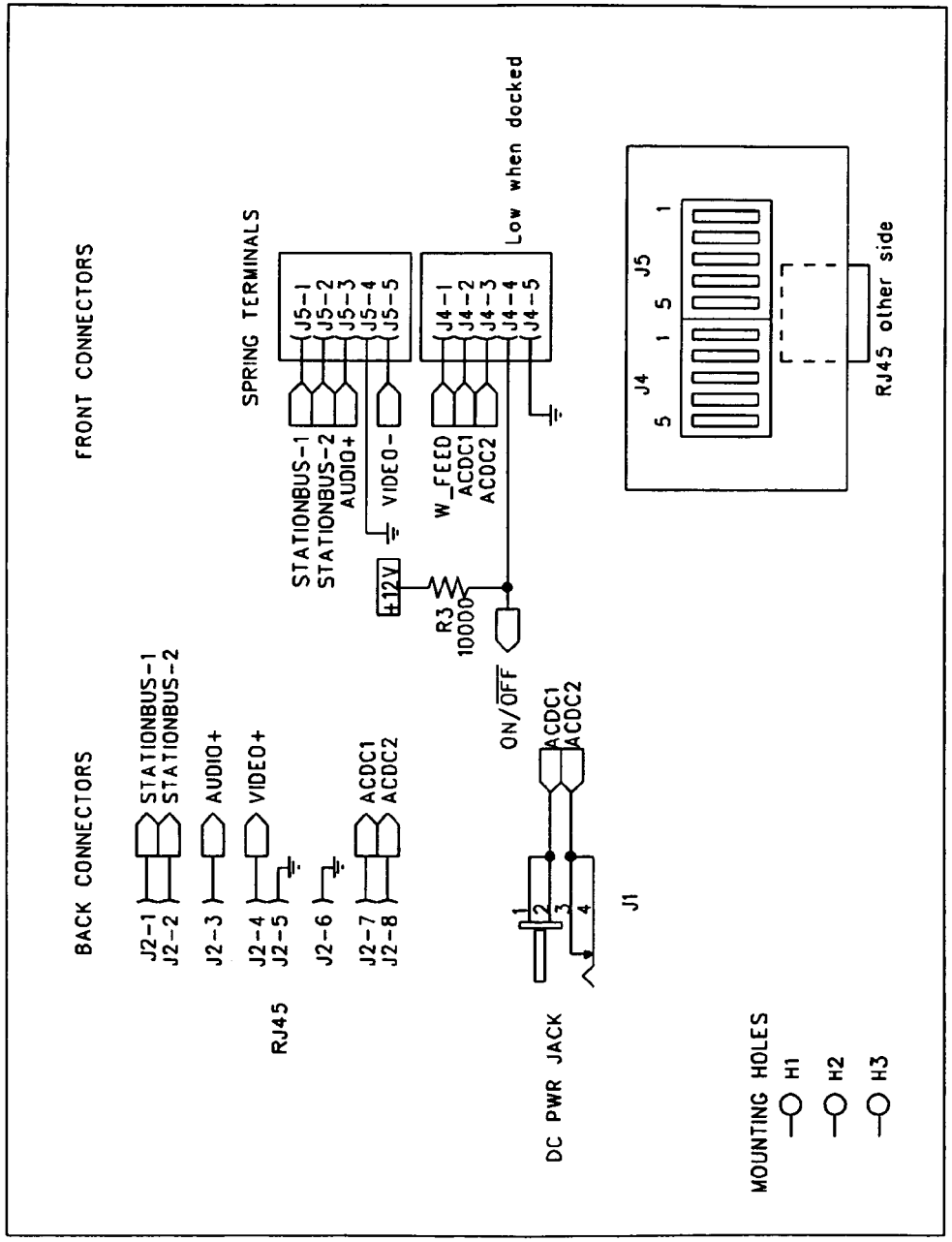

FIG. 8 illustrates another illustrative embodiment of the present invention in block diagram format. Hand-held unit 200 comprises a touchscreen 202, a speaker 246, video-in feed 214, audio-in feed 216, a battery 204 (which may be rechargeable), memory 206 (storing screens for interfacing), I/O ports 208 (including IR receiver, motion and light sensors). Hand-held unit 200 further comprises a first antenna 210 for sending and receiving data (including control and status information) and a second antenna 212 for receiving video and audio data. Hand-held unit 200 mates with docking station 220.

Switch 238 is operable to select a video data source between the second antenna 212 and the video-in feed 214. Switch 240 is operable to select an audio data source between the second antenna 212 and the audio-in feed 216. Switch 242 is operable to select a video source from between switch 238 and microprocessor 244.

Docking station 220 comprises a video-in feed 228, an audio-in feed 230, a video-out feed 222 and an audio-out feed 224. Docking station 220 further comprises an antenna 221 for transmitting audio and video data. Switch 234 is operable to select an output for incoming audio and video data between the antenna 221 and the video-out and audio out feeds, 222 and 224, respectively.

With the above configuration, when the hand-held unit 200 is docked in the docking station 220, the source for the video and audio data are the video-out feed 222 and audio-out feed 224. When the hand-held unit 200 is not docked, the source for the video and audio data is the second antenna 212 (the docking station transmits the video and audio data from antenna 221 to the second antenna 212).

In addition, switch 242 allows a user to select source between the video and audio data or data generated by processor 244. In this manner, the hand-held device 200 may use the video and audio data (such as images and sound from a security camera or a TV signal) or as a user interface.

Docking station 220 and hand-held unit 200 also comprise corresponding power connections, 226 and 218, respectively. This may be used to recharge battery 204 and provide power when the hand-held unit 200 is mated with docking station 220.

Hand-held unit 200 is programmable to control loads attached to an automation system. Hand-held unit 200 allows remote control as long as the first antenna 210 is within range. As mentioned, hand-held unit 200 may be used to play audio and video.

FIGS. 9A-13B illustrate exemplary schematics for embodiments of the present invention. These schematics should not be viewed as limiting in anyway on the scope of the present invention. Those skilled in the art will appreciate that other designs not specifically disclosed herein may nevertheless fall within the scope of the present invention.

Figure 14:
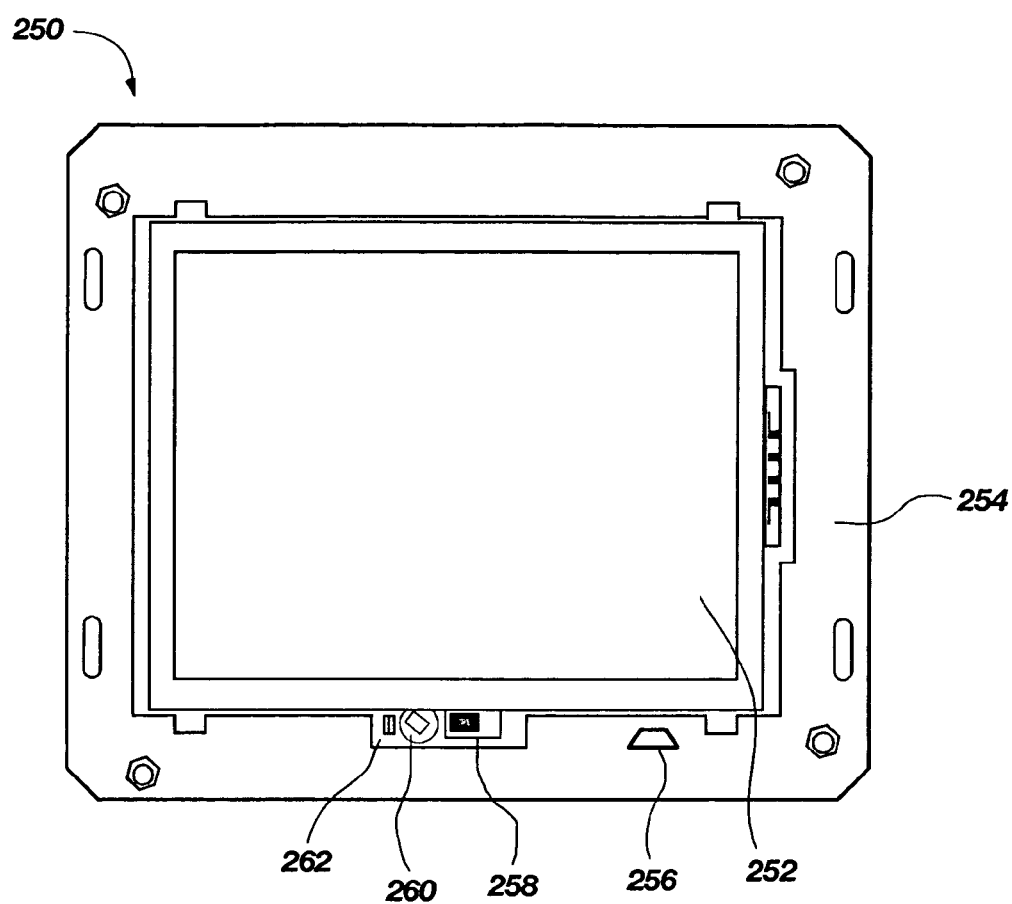
FIG. 14 provides a front view of another illustrative embodiment of the present invention.

FIG. 14 illustrates a front view of device 250 in accordance with an illustrative embodiment of the present invention. Device 250 comprises a touchscreen 252 mounted in a housing 254. Device 250 also comprises a mini-B USB connection 256, an IR receiver 258, a motion sensor 260, and an light sensor 262.

Figure 15:
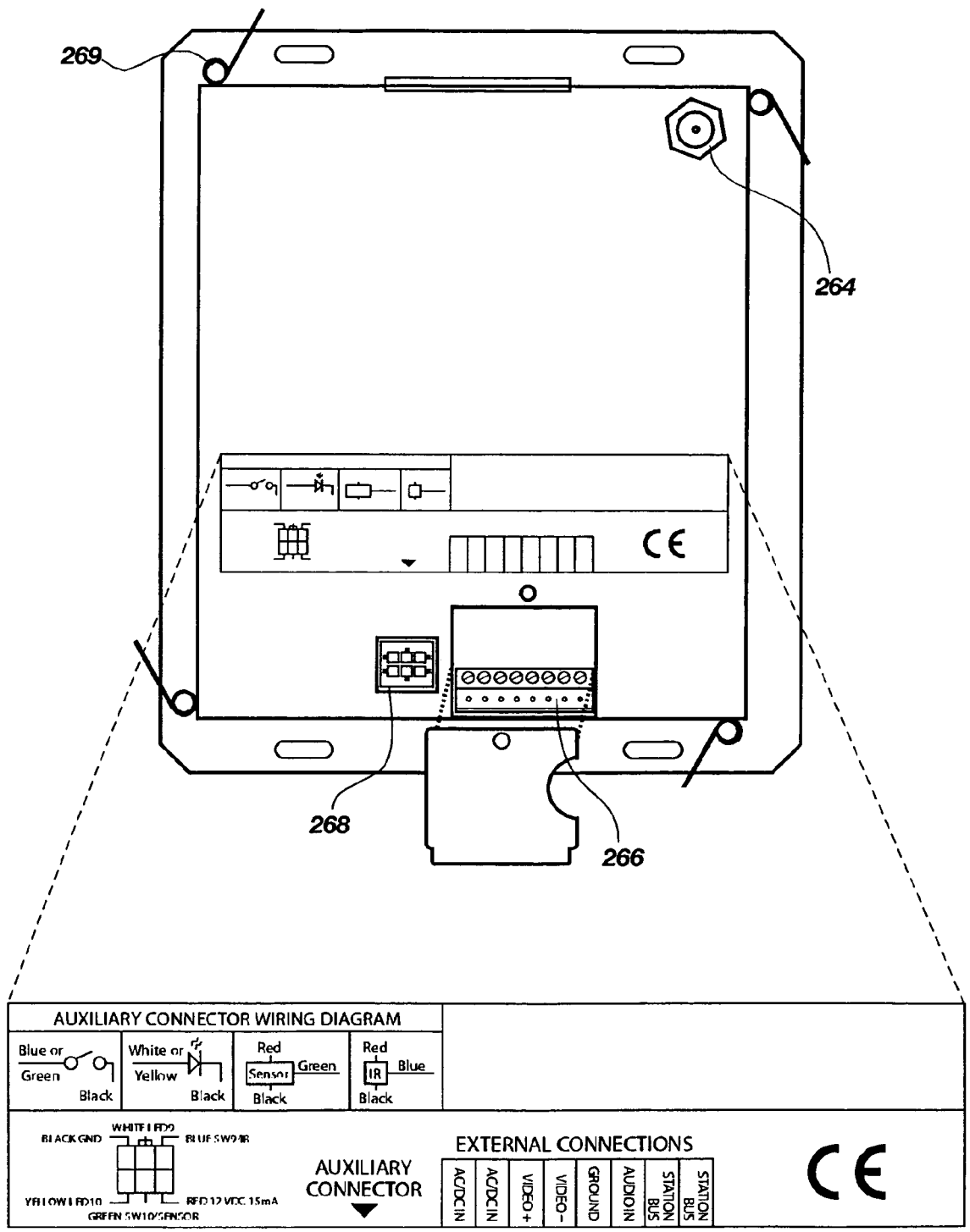
FIG. 15 provides a back view of another illustrative embodiment of the present invention.

FIG. 15 illustrates a rear view of device 250 in accordance with an illustrative embodiment of the present invention. Device 250 may comprise a coaxial cable connection 264, connections 266 for connecting a station bus, audio, video, ground, power, and other desired devices or features. Auxiliary connections 268 may be used to connect contact inputs or other similar devices or sensors. Wall fasteners 269 may be used to fasten to wall.

Figure 16:
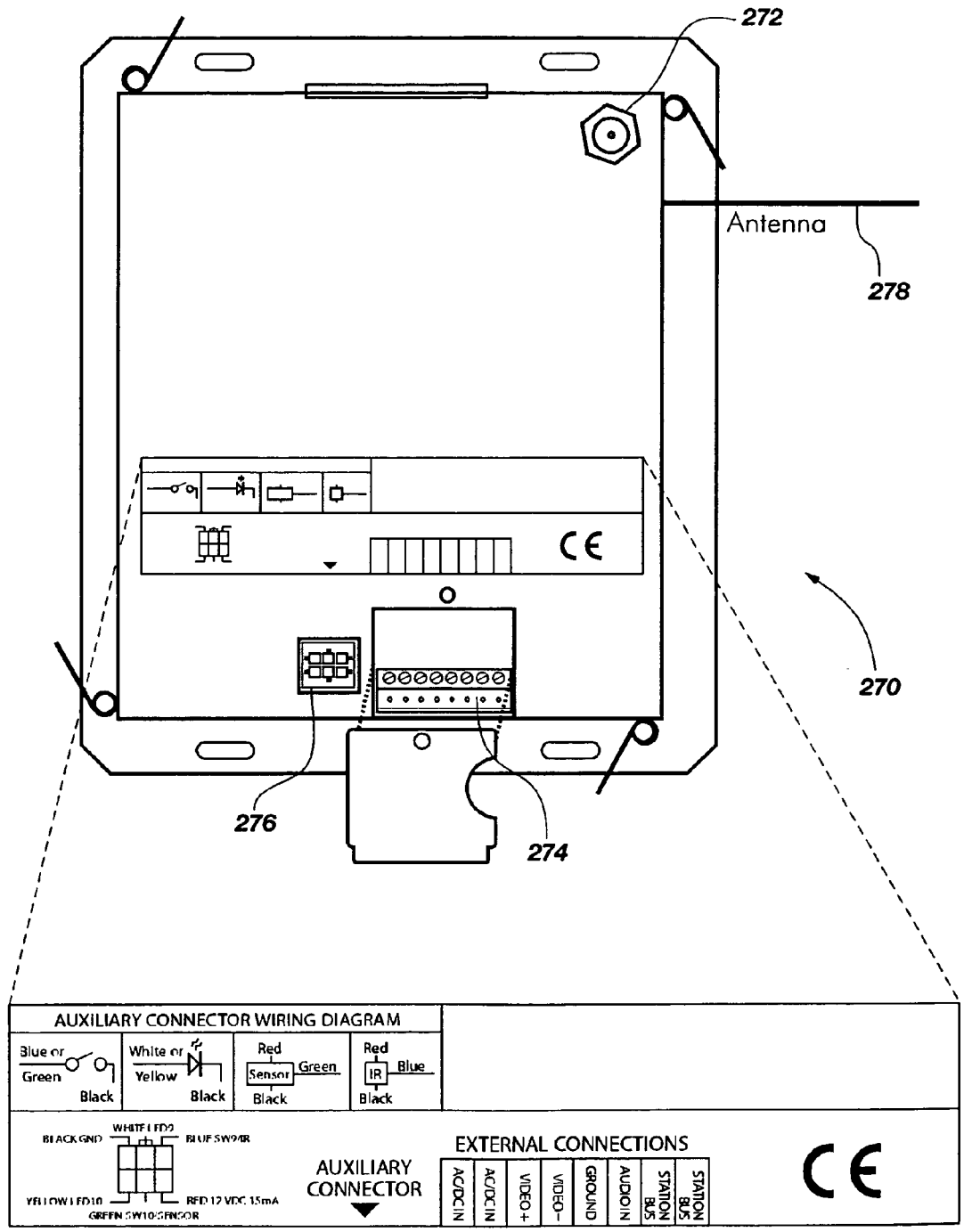
FIG. 16 provides a back view of another illustrative embodiment of the present invention.

FIG. 16 illustrates a rear view of a device 270 in accordance with an illustrative embodiment of the present invention. Device 270 may comprise a coaxial cable connection 272, connections 274 for connecting a station bus, audio, video, ground, power, and other desired devices or features. Auxiliary connections 276 may be used to connect contact inputs or other similar devices or sensors. Antenna 278 may be used to send and receive signals.

Several different illustrative embodiments of the present invention are possible. Illustrative embodiments of the present invention may be mounted on a wall or in a wall box or even be free standing or hand-held. A first illustrative embodiment comprises an integrated touch screen and motion sensor. A second illustrative embodiment comprises an integrated touch screen, motion sensor, and IR receiver. A third illustrative embodiment comprises an integrated touch screen, motion sensor and any one of the following: a station bus, an external power supply input and auxiliary inputs. A fourth illustrative embodiment comprises an integrated screen, motion sensor, IR receiver and any one of the following: a station bus, an external power supply input and auxiliary inputs. Another illustrative embodiment includes a hand-held touchscreen having a docking station and optionally receiving control information and video and audio wirelessly.

Another illustrative embodiment includes a touchscreen display having one or more of the following features: a proximity sensor to active the screen, an integrated IR receiver, status buttons (to display time, days of week, months, years, temperatures and/or lighting levels), programmable buttons and screens, an antenna for sending and receiving information wirelessly (including control information, status information, and audio and video), mounting wings, wall box installation, integrated video and audio input, auxiliary ports (for contact inputs, light sensors, motion sensors and other auxiliary devices), station bus connector, quarter VGA LCD display, mini-B USB connector, USB connector, a first antenna for receiving data and a second antenna for receiving audio and video, a battery (including a rechargeable battery), docking station connections (for receiving power, audio and video), coaxial cable connection, auto light sensor, memory, speaker, as well as other connections. The above illustrative embodiments should not be construed as limiting any other embodiments of the present invention in any way.

It will be appreciated that a motion sensor as disclosed herein is merely one example of a means for detecting the proximity of a human being, and it should be appreciated that any structure, apparatus or system for detecting the proximity of a human being which performs functions the same as, or equivalent to, those disclosed herein are intended to fall within the scope of a means for detecting the proximity of a human being, including those structures, apparatus or systems for detecting the proximity of a human being which are presently known, or which may become available in the future. Anything which functions the same as, or equivalently to, a means for detecting the proximity of a human being falls within the scope of this element.

It will be appreciated that a touch screen as disclosed herein is merely one example of a means for interfacing with a control system, and it should be appreciated that any structure, apparatus or system for interfacing with a control system which performs functions the same as, or equivalent to, those disclosed herein are intended to fall within the scope of a means for interfacing with a control system, including those structures, apparatus or systems for interfacing with a control system which are presently known, or which may become available in the future. Anything which functions the same as, or equivalently to, a means for interfacing with a control system falls within the scope of this element.

It will be appreciated that an IR receiver as disclosed herein is merely one example of a means for receiving wireless commands, and it should be appreciated that any structure, apparatus or system for receiving wireless commands which performs functions the same as, or equivalent to, those disclosed herein are intended to fall within the scope of a means for receiving wireless commands, including those structures, apparatus or systems for receiving wireless commands which are presently known, or which may become available in the future. Anything which functions the same as, or equivalently to, a means for receiving wireless commands falls within the scope of this element.

Those having ordinary skill in the relevant art will appreciate the advantages provided by the features of the present invention. For example, it is a feature of the present invention to provide a touch screen display for interfacing with a control system. Another feature of the present invention is to provide an integrated motion sensor such that the life of the backlight structure is extended. It is a further feature of the present invention, in accordance with one aspect thereof, to provide an integrated apparatus comprising a touch screen, motion sensor and IR receiver.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An automation apparatus comprising:
   a housing;
   a screen adapted to display information related to an automation system, the screen having adjustable illumination levels that include at least a first illumination level and a second illumination level;
   a screen backlight configured to adjust screen illumination;
   a non-contact motion sensor configured to detect at least one of motion or proximity of a human being without being contacted by the human being, said non-contact motion sensor also being configured to activate the screen backlight so that the screen backlight adjusts the screen illumination from the first illumination level to the second illumination level when the non-contact motion sensor detects at least one of motion or proximity of a human being;
   wherein the screen and non-contact motion sensor are mounted with respect to the housing; and
   wherein the illumination provided by the screen backlight in the second illumination level is greater than the illumination provided by the screen backlight in the first illumination level.

2. The apparatus of claim 1 further comprising an IR receiver mounted with respect to the housing.

3. The apparatus of claim 1 wherein the screen is a touch screen.

4. The apparatus of claim 1 further comprising a communications port mounted with respect to the housing.

5. The apparatus of claim 4 wherein the communications port is a USB port.

6. The apparatus of claim 1 wherein the housing further comprises at least two wall mounts configured to mount the housing with respect to a wall.

7. The apparatus of claim 6 wherein the at least two wall mounts are deployable wings.

8. The apparatus of claim 1 wherein the screen further comprises an external power supply input whereby the screen may receive power.

9. The apparatus of claim 1 wherein the screen is in communication with at least one master controller of the automation system, and wherein the screen further comprises a station bus configured to allow two-way communication between the screen and the master controller.

10. The apparatus of claim 1 wherein the screen further comprises a station bus configured to supply power to the screen.

11. The apparatus of claim 1 wherein the screen further comprises at least one auxiliary input configured to receive data from external devices.

12. The apparatus of claim 1, wherein the first illumination level is non-illuminated.

13. The apparatus of claim 1 wherein the non-contact motion sensor has adjustable motion or proximity sensitivity levels.

14. An automation apparatus comprising:
   a housing;
   a screen adapted to display information related to an automation system, the screen having adjustable illumination levels that include at least a first illumination level and a second illumination level;
   a screen backlight configured to adjust screen illumination;
   a non-contact motion sensor configured to detect at least one of motion or proximity of a human being without being contacted by the human being, said non-contact motion sensor also being configured to activate the screen backlight so that the screen backlight adjusts the screen illumination from the first illumination level to the second illumination level when the non-contact motion sensor detects at least one of motion or proximity of a human being;
   a first screen backlight control configured to allow a user to adjust the illumination of the first illumination level;
   a second screen backlight control configured to allow a user to adjust the illumination of the second illumination level;
   an IR receiver;

wherein the screen, non-contact motion sensor and IR receiver are mounted with respect to the housing; and wherein the illumination provided by the screen backlight in the second illumination level is greater than the illumination provided by the screen backlight in the first illumination level.

15. The apparatus of claim 14 wherein the screen further comprises a station bus.

16. The apparatus of claim 14 wherein the screen further comprises an external power supply input.

17. The apparatus of claim 14 wherein the screen further comprises at least one auxiliary input.

18. The apparatus of claim 14 wherein the housing further comprises at least two wall mounts configured to mount the housing with respect to a wall.

19. The apparatus of claim 18 wherein the at least two wall mounts are deployable wings.

20. The apparatus of claim 14 wherein the first illumination level is non-illuminated.

21. The apparatus of claim 14 wherein the non-contact motion sensor has adjustable motion or proximity sensitivity levels.

22. The apparatus of claim 14 further comprising a communications port mounted with respect to the housing.

23. The apparatus of claim 22 wherein the communications port is a USB port.

24. The apparatus of claim 14 wherein the IR receiver is configured to receive command signals from a remote to control at least one electrical device connected to the home automation system.

25. An automation apparatus comprising:
a housing;
a screen adapted to display information related to an automation system, the screen having adjustable illumination levels that include at least a first illumination level and a second illumination level;
a screen backlight configured to adjust screen illumination;
a non-contact motion sensor configured to detect at least one of motion or proximity of a human being without being contacted by the human being, said non-contact motion sensor also being configured to activate the screen backlight so that the screen backlight adjusts the screen illumination from the first illumination level to the second illumination level when the non-contact motion sensor detects at least one of motion or proximity of a human being;
a non-contact motion sensor control configured to allow a user to adjust the sensitivity level of the non-contact motion sensor;
an IR receiver;
wherein the screen, non-contact motion sensor and IR receiver are mounted with respect to the housing; and
wherein the illumination provided by the screen backlight in the second illumination level is greater than the illumination provided by the screen backlight in the first illumination level.

26. The apparatus of claim 25 wherein the screen further comprises at least one of the following: an external power supply input, at least one auxiliary input and a station bus.

27. The apparatus of claim 25 wherein the screen further comprises a station bus configured to supply power to the screen.

28. The apparatus of claim 25 wherein the screen is a touch screen.

29. The apparatus of claim 25 wherein the first illumination level is non-illuminated.

30. The apparatus of claim 25 further comprising a communications port mounted with respect to the housing.

31. The apparatus of claim 25 wherein the housing further comprises at least one wall mount configured to mount the housing with respect to a wall.

32. An automation apparatus comprising:
a housing;
a display means for displaying information related to an automation system, the display means having adjustable illumination levels that include at least a first illumination level and a second illumination level;
a screen backlight means for adjusting screen illumination;
a non-contact sensor means for detecting at least one of motion or proximity of a human being without being contacted by the human being, and for activating the screen backlight means so that the screen backlight means adjusts the screen illumination from the first illumination level to the second illumination level when the non-contact sensor means detects at least one of motion or proximity of a human being;
wherein the display means and non-contact sensor means are mounted with respect to the housing; and
wherein the illumination provided by the screen backlight means in the second illumination level is greater than the illumination provided by the screen backlight means in the first illumination level.

33. The apparatus of claim 32 further comprising a receiving means for receiving commands via wireless transmission, said receiving means mounted with respect to said housing.

34. The apparatus of claim 33 wherein the receiving means is an IR receiver.

35. The apparatus of claim 32 wherein the non-contact sensor means is a motion detector.

36. The apparatus of claim 32 wherein the display means is a touch screen.

37. A remote control apparatus comprising:
a housing;
screen adapted to display information related to an automation system, the screen having adjustable illumination levels that include at least a first illumination level and a second illumination level;
a screen backlight configured to adjust screen illumination;
a non-contact motion sensor configured to detect at least one of motion or proximity of a human being without being contacted by the human being, the non-contact motion sensor also being configured to activate the screen backlight so that the screen backlight adjusts the screen illumination from the first illumination level to the second illumination level when the non-contact motion sensor detects at least one of motion or proximity of a human being;
a first antenna in communication with at least one master controller of the automation system, the first antenna configured to send load control or status information to the master controller and to receive load control or status information from the master controller;
wherein the screen, non-contact motion sensor and first antenna are mounted with respect to the housing; and
wherein the illumination provided by the screen backlight in the second illumination level is greater than the illumination provided by the screen backlight in the first illumination level.

38. The apparatus of claim 37 further comprising a second antenna in communication with a docking station, the second antenna configured to receive audio or video data from the docking station.

39. The apparatus of claim 37 wherein the screen is a touch screen.

40. The apparatus of claim 37 wherein the housing is configured and dimensioned to be hand-held by a user.

41. The apparatus of claim 37 wherein the housing further comprises at least one connections configured to allow a user to releasably engage the housing to a docking station.

42. The apparatus of claim 41 wherein the at least one connections comprises a power connection.

43. The apparatus of claim 41 wherein the at least one connections comprises an audio or video connections.

44. The apparatus of claim 41 wherein the at least one connections comprises a bus connection.

45. The apparatus of claim 37 further comprising a a first screen backlight control configured to allow a user to adjust the illumination of the first illumination level; and
   a second screen backlight control configured to allow a user to adjust the illumination of the second illumination level.

46. The apparatus of claim 37 wherein the first illumination level is non-illuminated.

47. The apparatus of claim 37 further comprising a non-contact motion sensor control configured to allow a user to adjust the sensitivity level of the non-contact motion sensor.

48. The apparatus of claim 37 further comprising an IR receiver mounted with respect to the housing.

49. The apparatus of claim 37 further comprising a light sensor mounted with respect to the housing.

50. The apparatus of claim 37 wherein the non-contact motion sensor has adjustable motion or proximity sensitivity levels.

51. A remote control device comprising:
   a housing;
   a screen adapted to display information related to an automation system, the screen having adjustable illumination levels that include at least a first illumination level and a second illumination level;
   a screen backlight configured to adjust screen illumination;
   a non-contact motion sensor configured to detect at least one of motion or proximity of a human being without being contacted by the human being, the non-contact motion sensor also being configured to activate the screen backlight so that the screen backlight adjusts the screen illumination from the first illumination level to the second illumination level when the non-contact motion sensor detects at least one of motion or proximity of a human being;
   a radio transceiver in communication with a docking station, the radio transceiver configured to receive video or audio data from the docking station;
   a radio transmitter in communication with at least one master controller of the automation system, the radio transmitter configured to send load control signals to the at least one master controller of the automation system;
   wherein the screen, non-contact motion sensor, radio transceiver and radio transmitter are mounted with respect to the housing; and
   wherein the illumination provided by the screen backlight in the second illumination level is greater than the illumination provided by the screen backlight in the first illumination level.

52. The device of claim 51 wherein the screen is a touchscreen.

53. The device of claim 51 wherein the first illumination level is non-illuminated.

54. The device of claim 51 further comprising an IR receiver mounted with respect to the housing.

55. The device of claim 51 further comprising a video-in connector mounted with respect to the housing.

56. The device of claim 51 further comprising a an audio-in connector mounted with respect to the housing.

57. The device of claim 55 wherein the housing is configured to be mated with a docking station, the docking station having a video-out connector.

58. The device of claim 56 wherein the housing is configured to be mated with a docking station, the docking station having an audio-out connector.

* * * * *